United States Patent [19]

Young et al.

[11] Patent Number: 5,477,225
[45] Date of Patent: Dec. 19, 1995

[54] METHOD AND APPARATUS FOR ASSOCIATING TARGET REPLIES WITH TARGET SIGNATURES

[75] Inventors: Eddie L. Young, Columbus; Robert S. Huston, Worthington, both of Ohio

[73] Assignee: B F Goodrich FlightSystems, Inc., Columbus, Ohio

[21] Appl. No.: 153,722

[22] Filed: Nov. 16, 1993

[51] Int. Cl.$^6$ ............................. G01S 13/76; G01S 13/87
[52] U.S. Cl. ................................. 342/46; 342/32; 342/40
[58] Field of Search ................................. 342/46, 32, 37, 342/40, 90, 189

[56] References Cited

U.S. PATENT DOCUMENTS

| | | | |
|---|---|---|---|
| 3,733,603 | 5/1973 | Johnston | 342/200 |
| 4,710,774 | 12/1987 | Gunny | 342/455 |
| 4,733,241 | 3/1988 | Litchford et al. | 342/453 |
| 4,768,036 | 8/1988 | Litchford et al. | 342/455 |
| 4,870,425 | 9/1989 | Gunny | 342/455 |
| 5,144,316 | 9/1992 | Uhlmann et al. | 342/189 |
| 5,223,837 | 6/1993 | Grossman | 342/13 |
| 5,257,307 | 9/1993 | Gandar et al. | 342/192 |
| 5,387,915 | 2/1995 | Moussa et al. | 342/40 |
| 5,406,288 | 4/1995 | Billaud et al. | 342/37 |

Primary Examiner—John B. Sotomayor
Attorney, Agent, or Firm—Leonard L. Lewis; William E. Zitelli

[57] ABSTRACT

Apparatus for associating target reply signals with target signatures, wherein each reply signal is received from a target transponder within a selectable time period, and further wherein each target signature comprises a first set of parameter values that identify a target position and movement relative to an interrogating aircraft, the apparatus including reply processor means for producing a target report for each reply signal, the target report having a second set of parameter values; and report processing means for: 1) comparing each target report with each target signature to identify which report/signature pairs are potential matches, each comparison between a target report and a target signature being based on comparisons of corresponding parameter values to produce a probability of match for each parameter comparison; and 2) identifying which report/ signature matches are best based on comparison of each report/signature potential match with each other potential report/signature potential match including comparison of the parameters' probabilities of match. An improved method for compensating inaccurate bearing data is also provided.

25 Claims, 9 Drawing Sheets

| | |
|---|---|
| 420 | Target signature has bearing information |
| 422 | Paoa = 0: Pdaz = 0 |
| 424 | Target report has AOA |
| 426 | Paoa = 0 |
| 428 | Compute AOA difference (absolute difference in AOA) |
| 430 | AOA difference < AOA gate |
| 432 | AOA difference < AOA gate + 20° |
| 434 | Paoa = 0 |
| 436 | Return "No" |
| 438 | Paoa = 1 − 0.75 (aoa difference/AOA gate): Set MATCH ON AOA flag |
| 440 | Report has DAZ |
| 442 | Pdaz = 0 |
| 444 | Compute DAZ difference |
| 446 | DAZ difference < DAZ gate |
| 448 | Pdaz = 1 − 0.75 (DAZ difference/DAZ gate): Set MATCH ON DAZ flag |
| 450 | Return "No" |
| 452 | Compute DTA difference |
| 454 | DTA difference < DTA gate |
| 456 | Pdta = 1 − 0.8 (DTA difference/DTA gate) |
| 458 | Return "No" |
| 460 | Target signature = NAR and target report = NAR |
| 462 | Palt = 1: ALT score = EXACT: set MATCH ON ALT flag |
| 464 | Target signature predicted altitude = INVALID ALT |
| 466 | Palt = 0: ALT score = MISMATCH |
| 468 | Repair Mode C = False |
| 470 | Target report = INVALID ALT |
| 472 | Palt = 0: ALT score = MISMATCH: Repair Mode C = true |
| 474 | Compute altitude difference |
| 476 | ALT difference < ALT gate |
| 478 | Palt = 1 − 0.8 (ALT difference/ALT gate): set MATCH ON ALT flag: ALT score = EXACT |
| 480 | Repair Mode C = true |
| 482 | Target Report Mode C garbled |
| 484 | Palt = 0: ALT score = UNSURE: Repair Mode C = true |
| 486 | Return "No" |
| 488 | Repair Mode C code |
| 490 | Set MATCH ON ALT flag: ALT score = EXACT: Palt = 1 − 0.8 (ALT difference of repaired/Alt gate) |
| 492 | Target Report bottom antenna only |
| 494 | Return "No" |
| 496 | Target Report = NAR |
| 500 | Target Report has IDENT and Target Signature has IDENT |
| 502 | Pident = 0.5 |
| 504 | Target Report IDENT = Target Signature IDENT |
| 506 | Pident = 1: set MATCH ON IDENT flag |
| 508 | Count up the number of bits of IDENT code that match |
| 510 | Assign Pident based on number of bits of IDENT code that match |
| 512 | Compute Pm |
| 514 | Return "Yes" |

| | |
|---|---|
| 200 | Reply report Mode C code's ABD bits equal the predicted Mode C code's ABD bits |
| 202 | Reply report Mode C code's ABD bits equal the predicted Mode C code'plus 500ft ABD bits |
| 204 | Reply report Mode C code's ABD bits equal the predicted Mode C code minus 500ft ABD bits |
| 210 | Reply report Mode C code's C bits are valid |
| 212 | Reply report Mode C code's C bits are valid |
| 214 | Reply report Mode C code's C bits are valid |
| 216 | Use predicted Mode C code's C bits along with the Reply report Mode C code's ABD bits to compare REPAIR 1 value |
| 228 | Computes REPAIR 1 value from Reply report Mode C code |
| 218 | Use predicted Mode C code plus 500ft C bits along with the Reply report Mode C code's ABD bits to compute REPAIR 1 value |
| 230 | Compute REPAIR 1 value from Reply report MODE C code |
| 220 | Use predicted Mode C code minus 500ft C bits along with the Reply report Mode C code's ABD bits to compute REPAIR 1 value |
| 232 | Compute REPAIR 1 value from Reply report MODE C code |
| 206 | REPAIR 1 value is set to INVALID ALTITUDE |
| 222 | Is REPAIR 1 value not equal to INVALID ALTITUDE |
| 224 | Does REPAIR 1 value fall within the altitude gate |
| 226 | Compute goodness of fit for REPAIR 1 value |
| 208 | Repair method 1 cannot be used |
| 228 | Reply report Code C code has < 2 bits of garble in the ABD bits |
| 230 | Reply report Mode C code's ABD bits equal the predicted Mode C code's ABD bits when we ignore the bits that are identified as being garbled |
| 232 | Reply report Mode C code's ABD bits equal the predicted Mode C code plus 500ft ABD bits when we ignore the bits that are identified as being garbled |
| 234 | Reply report Mode C code's ABD bits equal the predicted Mode C code minus 500ft ABD bits when we ignore the bits that are identified as being garbled |
| 240 | Reply report Mode C code's C bits are valid |
| 242 | Reply report Mode C code's C bits are valid |
| 244 | Reply report Mode C code's C bits are valid |
| 246 | Use predicted Mode C code to compute REPAIR 2 value |
| 258 | Use predicted Mode C mode s ABD bits along with Reply report Mode C code's C bits to compute REPAIR 2 value |
| 248 | Use predicted Mode C code plus 500ft to compute REPAIR 2 value |
| 260 | Use predicted Mode C code plus 500ft ABD bits along with the Reply report Mode C code's C bits to compute REPAIR 2 value |
| 250 | Use predicted Mode C code minus 500ft to compute REPAIR 2 value |
| 262 | Use predicted Mode C code minus 500ft ABD bits along with the Reply report Mode C code's C bits to compute REPAIR 2 value |

MATCH TO FIG. 7B2

MATCH TO FIG. 7B1

| | |
|---|---|
| 236 | REPAIR 2 value is set to INVALID ALTITUDE |
| 252 | Is REPAIR 2 value not equal to INVALID ALTITUDE |
| 254 | Does REPAIR 2 value fall within the altitude gate |
| 256 | Compute goodness of fit for REPAIR 2 value |
| 238 | Repair method 2 cannot be used |
| 264 | Find best value of repair (either Method 1 or Method 2) |
| 268 | Is there a useable repaired value |

Fig. 7B2

| | |
|---|---|
| 520 | Start at beginning of match table at first Target Report edge |
| 522 | Maximum Pcc = 0; Best Match = None; Best Pcc = 0; Best Paoa = Best Palt = 1 |
| 524 | Get next match of Target Report to Target Signature |
| 526 | Pcc = this match's Pcc; Palt = this match's Palt; Paoa = this match's Paoa |
| 528 | Pcc > Maximum Pcc |
| 530 | Maximum Pcc = Pcc |
| 532 | Pcc > 1.15 best Pcc |
| 534 | Pcc ≥ 0.85 Maximum Pcc |
| 536 | Palt > best Palt and Paoa > best Paoa |
| 538 | Palt ≥ best Palt |
| 540 | Paoa ≥ best Paoa |
| 542 | bestMatch did not match on AOA and this match did |
| 544 | This match ALT score = EXACT |
| 546 | bestMatch did not match on AOA |
| 548 | This match matched on AOA |
| 550 | Paoa ≥ best Paoa |
| 552 | Paoa > 0.85 best Paoa and Palt > best Palt |
| 556 | Palt > best Palt and Target Report has AOA |
| 558 | This match ALT SCORE = UNSURE or ALT SCORE = MISMATCH |
| 560 | The bestMatch ALT SCORE = EXACT |
| 554 | bestMatch = this Match; best Pcc = Pcc; best Paoa = Paoa; best Palt = Palt |
| 562 | bestMatch = None |
| 564 | Return |
| 566 | Update the Target Signature with this match |
| 568 | Mark out this match such that the Target Report corresponding to this match will not be used to update any other Target Signatures |

Fig. 8B

METHOD AND APPARATUS FOR ASSOCIATING TARGET REPLIES WITH TARGET SIGNATURES

BACKGROUND OF THE INVENTION

The invention relates generally to detecting and tracking aircraft using coded reply signals transmitted from aircraft transponders. More specifically, the invention relates to such detecting and tracking under conditions in which multiple target reply signals are received during a receive interval following an interrogation and need to be matched to multiple target signatures or tracks.

Air traffic control and safety are ongoing concerns in commercial and military aviation. Particularly significant concerns are traffic alert and collision avoidance between aircraft either in route between or in the vicinity of landing fields. Ever increasing air traffic demands have resulted in governmental regulations that require commercial carriers to equip planes with active interrogation systems that can determine the presence and threat of nearby aircraft called targets. The particular system mandated by the government depends on the aircraft size. Large commercial aircraft that carry over 30 passengers are being equipped with an active traffic and collision avoidance system (TCAS II) that not only detects and displays nearby aircraft, but also alerts the crew as to impending collisions, and also provides resolution advisories such as audible instructions to the pilot to pull up or down, maintain level or climb rate and so forth. This system, however, is very complex and expensive and therefore has not been mandated for smaller aircraft.

For aircraft that carry up to 30 passengers, governmental regulations require such aircraft be equipped with an active interrogation system (TCAS I) that detects nearby aircraft, determines and displays range, bearing and altitude of such aircraft relative to the interrogating plane, and tracks such aircraft within a prescribed range and issues an audible alert to the crew as to impending collisions. Although the operational performance of the TCAS I system appears less complex than TCAS II, numerous problems arise that make a cost effective system difficult to realize.

The Federal Aviation Administration (FAA) specifies that the TCAS I active interrogation systems use air traffic control radar beacon system (ATCRBS) signals. These ATCRBS interrogation signals are high frequency pulse amplitude modulated signals at 1030 Megahertz. The reply signals are also pulse amplitude modulated but at a carrier frequency of 1090 Megahertz. In TCAS I, the reply and interrogation signals are transmitted from an interrogation aircraft to other aircraft in the vicinity thereof, and these other aircraft respond to the interrogations via a transponder located on the aircraft.

The interrogation and reply signal waveforms are specified by the FAA. The information contained in the reply signal depends on the type of interrogation (e.g. Mode A, Mode C) and the transponder equipment that the interrogated aircraft has available for responding. For TCAS I, the interrogation mode is Mode C, and the Mode C reply signal from the aircraft transponder consists primarily of encoded altitude data. The altitude data is encoded using binary logic states or bits arranged in four digit octal codes (i.e. each octal altitude code has twelve data bits with each octal digit defined by three data bits). The reply signal data bits are transmitted within a pair of framing pulses called bracket pulses that indicate (for purposes of TCAS I) the beginning and end of an altitude code reply signal from a particular aircraft responding to an interrogation.

A TCAS I system is specified based on the use of these ATCRBS Mode C reply signal waveforms. Thus, an interrogating aircraft may transmit an interrogation signal at 1030 MHz, and then will "listen" for Mode C reply signals from all aircraft capable of responding by transmitting the bracket pulses and altitude encoded data pulses. Some aircraft are not equipped to reply with altitude data (non-altitude reporting, or NAR) and hence only transmit the bracket pulses. Under TCAS I, aircraft within a range of about 34 nautical miles will reply to a Mode C interrogation.

In addition to having to detect and decode reply signals, a TCAS I compatible system must be able to track responding aircraft so as to provide traffic alert information. This can be done, for example, by means of a visual display that shows in a real time manner the movement and altitude of aircraft that are being tracked by the system. This tracking is accomplished by decoding the reply signals and deciding which reply signals can be correlated over a number of update sequences to provide a target signature. A target signature can be thought of as a number of tracked parameters decoded from the reply signals that indicate the most current estimate of position and movement of a target relative to the interrogating aircraft, including range, bearing and altitude parameter tracks. Once a target signature has been established, it must be periodically updated, preferably during each update period following an interrogation, in order to maintain current information on the target.

Reply signal decoding, tracking and matching is less complicated in low traffic areas because there will tend to be only a few reply signals received during each listening period following an active interrogation by the interrogating aircraft. Typically, only a few aircraft will be tracked, and only a few reply signals will be received that need to be matched with those target signatures to update and maintain tracking information.

In higher traffic areas, however, numerous problems arise that make target tracking much more difficult. In TCAS I, for example, an interrogation sequence includes a number of transmissions from the interrogating aircraft, called a whisper/shout sequence, that is intended to reduce the number of replies received at the same time. However, the TCAS I whisper/shout sequence cannot prevent multiple reply signals from being returned from multiple targets during the same time interval. Therefore, not only must a TCAS I system be able to detect and separate these multiple and overlapping reply signals, but it must also then be able to match correctly each reply with its target signature (assuming that a reply is from an aircraft that has an established signature). In other words, the system must be able to perform an accurate data association between newly received reply signals and established target signatures. When multiple targets are in the vicinity of the interrogating aircraft, this data association becomes very important so that the target tracks can be updated with the most accurate and current information available to the system.

In addition to reply signals received from active interrogation transmissions from an interrogating aircraft, the interrogating aircraft may also receive and detect passive reply signals. These passive reply signals are issued by target aircraft in response to radar interrogations from ground based air traffic control, for example. In addition to providing range, bearing and altitude information, these passive replies may also include differential azimuth and target aircraft identification information. This additional information can be useful for enhancing target tracking and update.

Because target aircraft move constantly with respect to an interrogating aircraft, an important aspect of a TCAS I system is the use of target signature information to predict the position and movement of the targets. This enables the system to more accurately match the various reply signals to established signatures. An important parameter that is predicted is target altitude. Typically, target altitude will not change drastically between interrogation intervals used in TCAS I. Therefore, once a target signature has been established, altitude is a useful parameter for matching a reply signal to update its signature. Although not all targets will be equipped to respond with an altitude code (such aircraft being referred to herein as non-altitude reporting or NAR), those that do transmit altitude codes will occasionally have their altitude codes become garbled during the transmission, receiving and decoding process, particularly in high traffic areas where there are many overlapping reply signals. Target signature update can be enhanced if such garbled altitude codes can be repaired.

The objectives exist, therefore, for a traffic alert and collision avoidance system that can accurately associate or correlate target reply signals with established target signatures. As part of this process, such a system should be able to repair garbled codes to enhance target signature updates.

SUMMARY OF THE INVENTION

In view of the aforementioned objectives, the invention contemplates, in one embodiment, apparatus for associating target reply signals with target signatures, wherein each reply signal is received from a target transponder within a selectable time period, and further wherein each target signature comprises a first set of parameter values that identify a target position and movement relative to an interrogating aircraft, comprising:

reply processor means for producing a target report for each reply signal, the target report comprising a second set of parameter values; and report processing means for : 1) comparing each target report with each target signature to identify which report/signature pairs are potential matches, each comparison between a target report and a target signature being based on comparisons of corresponding parameter values; and 2) identifying which report/signature matches are best based on comparison of each report/ signature potential match with each other potential report/signature potential match.

The invention also contemplates the methods embodied in the use of such apparatus, as well as a method for associating target reply signals with target signatures, wherein each reply signal is received from a target transponder within a selectable time period, and further wherein each target signature comprises a first set of parameter values that identify a target position and movement relative to an interrogating aircraft, comprising the steps of:

a. producing a target report for each reply signal, said target report comprising a second set of parameter values;

b. comparing each target report with each target signature to identify which report/signature pairs are potential matches, each comparison between a target report and a target signature being based on comparisons of corresponding parameter values; and c. identifying which report/signature matches are best based on comparison of each report/signature potential match with each other potential report/signature potential match.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
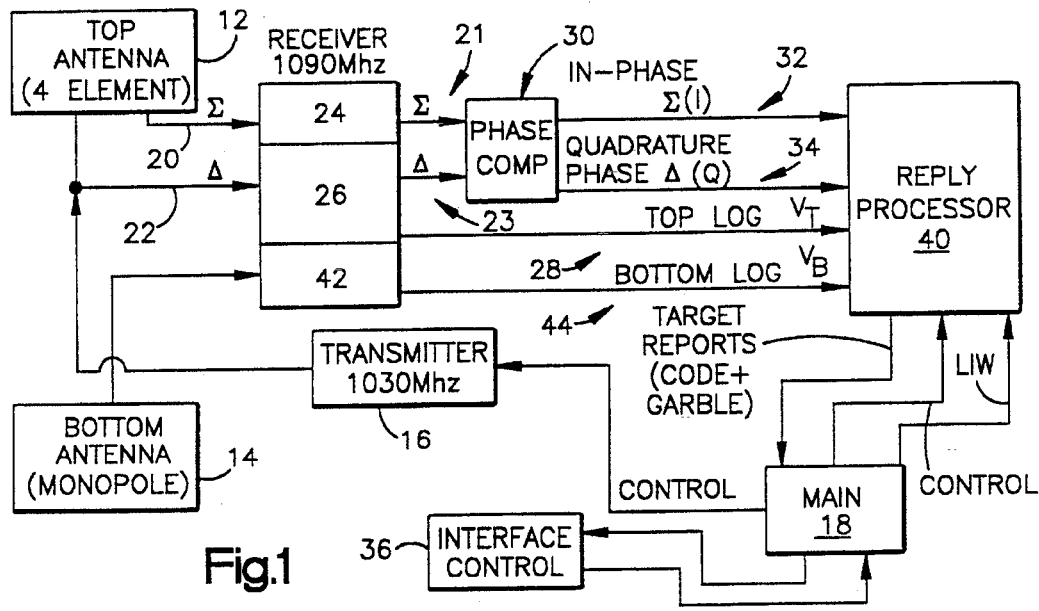
FIG. 1 is system level functional block diagram of a traffic alert and collision avoidance system according to the present invention.

With reference to FIG. 1, an interrogation and reply decoding system for aircraft is shown in system level functional block diagram form and generally indicated with the numeral 10.

Although the invention is described herein with particular reference to an embodiment in an active interrogation system that conforms to the traffic alert and collision avoidance system (TCAS I), such description should not be construed in a limiting sense. Various aspects of the invention relating to reply signal detection and decoding methods and apparatus can be applied in other applications (including, for example, passive systems) wherein it is necessary to detect and decode transmitted signals that have characteristics or problems similar to detecting the ATCRBS reply signals used in a TCAS I environment. Rather, the invention is more generally directed to apparatus and methods for associating reply signals with multiple target signatures and tracking information.

The system 10 in this case includes a first or top antenna 12 and a second or bottom antenna 14. The top antenna 12 is used both to transmit interrogation signals from an aircraft in an omnidirectional manner, as well as to receive reply signals from nearby aircraft from any bearing location relative to the interrogating aircraft. The bottom antenna 14 is used only as a non-directional receiving antenna for such reply signals. The top antenna is referred to herein as being a directional antenna because it is used to provide bearing information for aircraft responding to an interrogation (called a target(s) hereinafter). The bottom antenna is referred to herein as a non-directional antenna because it is not used to provide target bearing information. Reply signals can be received by either or both antennas.

In a TCAS I compatible system such as described herein, the system 10 is installed on an aircraft such as a regional airliner or a commuter aircraft that is used to carry thirty passengers or less. The basic function of the system 10 is to transmit Mode C interrogation signals via the top antenna 12 omnidirectionally from the interrogating aircraft. All aircraft that are equipped in a conventional manner with a transponder will detect the interrogation signals and in turn issue a Mode C (if altitude reporting) reply signal that is transmitted omnidirectionally from each responding aircraft.

As previously described herein, the TCAS I Mode C reply signal is a pulse amplitude modulated encoded signal having a waveform specified by the FAA. For purposes of understanding the present invention, a detailed explanation of the reply signal format is not required. Of importance is the understanding that, for each reply signal issued by an altitude reporting aircraft, each reply signal will include the target aircraft's altitude encoded as an octal Gray code comprising 12 data bits. These data bits are determined by a reply processor described herein, and the reply processor issues a target reply report that includes, among other data, the twelve bit altitude code of the target.

In addition to receiving Mode C reply signals from targets in response to Mode C interrogations from the interrogating aircraft (hereinafter called "active" reply signals), the interrogating aircraft may also receive reply signals that were transmitted by targets in response to other aircraft interrogations or in response to interrogations from ground based air traffic control systems. For purposes of this disclosure, such reply signals are referred to herein as "passive" replies, because with respect to an interrogating aircraft, the replies were not transmitted in response to that aircraft's signals. The present invention is not limited to using passive information, however, if such data is available it preferably is used.

Such passive reply signals can be processed to obtain information about targets even though they are not in direct response to an active interrogation. For example, a passive reply signal may include Mode A aircraft identification data, as well as differential azimuth data. Aircraft ID information is encoded in a manner similar to Mode C altitude. Differential azimuth is defined as the angle formed by a radar scan, the target and the receiving aircraft with the radar at the angle vertex. Passive reply processing is fully described in U.S. Pat. No. 4,789,865, issued to Litchford, the entire disclosure of which is fully incorporated herein by reference. For purposes of the present invention, it is sufficient to understand that the aircraft ID and differential azimuth data can be determined by the system 10 and included as part of a target report.

In general then, the system 10 is configured to receive and detect active and passive reply signals from nearby targets and to decode the reply signals in order to determine range, bearing, ID, differential azimuth and relative altitude parameter data or values of the respective targets with reference to the interrogating aircraft. One or more of these parameters can comprise a target report, and upon verifying such reports over a selected number of interrogation/update cycles, the system 10 establishes a target signature. A "target signature" refers to the parameter data available to the system 10 for tracking the position and movement of a target relative to the interrogating aircraft. These parameters, for each and all replies detected during each interrogation listening period, are determined and passed from the reply processor in the form of an electronic target report, to a main processor for target signature initiating and update. Thus, each target report corresponds to the data obtained by signal processing and decoding of its associated reply signal. A target signature thus can include a number of tracked parameter data available on each target, and will typically include at least the target range, target altitude code and target bearing. Furthermore, once a target signature is initiated, the system 10 can predict the target parameters expected for the next set of update values, based on the information available from the prior replies such as target range rate, bearing rate and altitude.

Although a detailed explanation of target tracking and update (prediction) is not required for understanding the present invention, a general description is provided herein to exemplify how the invention can be integrated into an overall traffic alert and collision avoidance system. Target tracking is performed in the present embodiment of the invention by identifying three target reports that can be matched in such a manner as to define a straight line or flight path of the target. This is accomplished, in general, by analyzing target movement relative to the interrogating or reference aircraft based on the target report data including the range, bearing and altitude parameters. Each available parameter is analyzed to try to establish a track on that parameter. Once three target reports have been identified that can be fit to a straight line, target tracking is declared valid and the target signature is defined as the last known estimate of the location and movement of the target, which usually will correspond to the updated parameters of the most recently matched target report.

In the embodiment of the invention described herein, target range and bearing data can be used to plot the position and movement of a target in an X-Y type coordinate system. Because target position and movements are visually displayed with reference to the interrogating aircraft, the coordinate system will be referred to herein as a north-east (n-e) coordinate system, rather than an X-Y coordinate system. This designation, however, is for convenience only.

For each target report, the information available to establish target tracking includes the time that the report was received (t), the range of the target (r), the bearing of the target ($\theta$), and the altitude of the target (a). The north (n) and east (e) coordinates can be easily computed from the bearing and range data from the following relationships:

$$n = r * \cos(\theta)$$

$$e = r * \sin(\theta)$$

With interrogation sequences occurring about every two seconds or so, multiple target reports should be available for attempting to establish a target signature by establishing tracks for the available parameters. Once three target reports have been identified that fit into a target path, target movement can be tracked by calculating such factors as range rate (i.e. the time rate of change of the target range with respect to the interrogating aircraft), bearing rate and velocity. Thus, various parameter tracks are maintained in an effort to keep updating a target signature, including range, bearing and velocity. An altitude track is also maintained because altitude is one of the more important target parameters available for matching target reports to established target signatures.

The criteria for establishing a target signature are rather stringent, because it is not desirable to track false targets or to provide erroneous information on targets. However, once a target signature is established, every effort is made to maintain that signature for as long as the target presents a potential threat to the interrogating aircraft.

For purposes of explaining the target initiation process, we will assume that three target reports, $P_0$, $P_1$ and $P_2$, are available that include range, bearing and time data, with the n and e data being computed therefrom for each report. The $P_0$ report is the most recent report, $P_1$ the middle report, and $P_2$ the earliest report, so that $t_2 < t_1 < t_0$. As a preliminary gate, the ranges and bearings of $P_0$ and $P_1$ are checked by computing $\Delta\theta = \theta_0 - \theta_1$ and $\Delta r = r_1 - r_0$. If we define a wide bearing gate $\theta_g$ and a wide range gate $r_g$, then $P_0$ and $P_1$ are declared a match (for target initiation purposes) if $\Delta\theta \leq \theta_g$ and $\Delta r \leq r_g$.

If $P_0$ and $P_1$ match, then the following values can be computed:

$$T_1 = t_1 - t_0$$

$$V_n = (n_1 - n_0)/T_1$$

$$V_e = (e_1 - e_0)/T_1$$

where $v_n$ and $v_e$ are the n and e velocities respectively based on their value change over a known time period ($T_1$).

With $v_n$ and $v_e$ known, predicted values for n, e, r and $\theta$ can be computed for the third target report $P_2$:

$$T_2 = t_2 t_1$$

$$n_p = n_1 + v_n * T_2$$

$$e_p = e_1 + v_e T_2$$

$$r_p = SQRT(n_p^2 + e_p^2)$$

$$\theta_p = arctan(e_p/n_p)$$

where $n_p$, $e_p$, $r_p$ and $\theta_p$ are the predicted values for the $P_2$ report based on the preliminary tracks established from the $P_0$ and $P_1$ reports.

In order to match now the third report $P_2$ to the other two reports, stricter gates are imposed such that $\theta_g$ is now set to a narrow bearing gate and $r_g$ is set to a narrow range gate. If $\Delta\theta = \theta_p - \theta_2$ is within the narrow bearing gate, and further if $\Delta r = r_2 - r_p$ is within the narrow range gate, then a path is declared for the $P_0$, $P_1$ and $P_2$ reports. A least squares estimate of the "straight line" defined by the three reports is then calculated to determine the best estimate of the n, e, $v_e$, and $v_n$ values of the target at time $t_0$. These values then become the anchor values for the target report. Note that $v_e$ and $v_n$ can be used to derive the target velocity and predicted target position and movement (e.g. range based on predicted n and e values) by using the n and e velocities and knowing the elapsed time until the next target reports are received that will be attempted to be matched to the signature using the data association process.

If three target reports are not available all with bearing information, target tracking can still be established if at least two reports have bearing (so that bearing rate can be computed) and the report used as the head point (anchor) of the target path has bearing. In the case where only two reports have bearing, a simple linear fit is used rather than a least squares fit in order to derive the best estimates of the n, e, $v_n$ and $v_e$ values for the target signature.

Tracking of the target altitude is established in a similar manner by comparing the altitude codes of the three reports and verifying that they match within predetermined gates for initiating target tracking. Thus, target tracking is performed in three dimensions. The visual display for the crew of the aircraft typically is in the form of the n-e coordinate system with altitude displayed alongside a visual marker that indicates the position of the target relative to the interrogating aircraft.

A target can be tracked based on target reports that do not have bearing by tracking the altitude and range parameters. These tracks are established in a manner similar to that described in the above example, such as by computing a best estimate of the target range and range rate based on the range data available from the reports and verifying that the range parameters fit within predetermined gates to establish a track. However, such target tracking is not displayed unless bearing information has been obtained. Rather, a report can be displayed that indicates in text form that a target has a known range and altitude, when such target becomes a threat to the interrogating aircraft.

Although target bearing data is very important to the initiation of target signatures, bearing data is inherently inaccurate. This is particularly true in high traffic areas where reply signals can become garbled. Errors in the bearing data will cause tracking errors because target position and movement (including velocity) are computed and predicted based on bearing data and the bearing time rate of change. This is apparent from the above description in which bearing data is used to compute the n, e, $v_n$ and $v_e$ values.

Bearing rate of change or $v_\theta$ is thus very important in initially determining the target position and movement for the anchor report, since all future predictions and target updates are based on these initial calculations. However, the effect of bearing data error on calculations of target movement, particularly target velocity, increases with the range of the target. This follows from the following analysis. If a target position is defined by the r and $\theta$ values, and its movement is tracked by observing the time rate of change of r and $\theta$, then as r increases, $v_\theta$ increases proportionately because $v_\theta = r * d\theta/dt$. Any errors in the determination of $d\theta/dt$ (such as caused by inaccurate bearing data) will thus be magnified at longer ranges.

The bearing rate, $v_\theta$, can be derived from the following expression:

$$v_\theta = (v_e * n - v_n * e)/r$$

Because the forward velocity vector $V_f$ equals the vector sum of $V_n$ and $V_e$, it can be shown that $v_n = v_r \cos\theta - v_{74} \sin\theta$; and that $v_e = v_r \sin\theta + v_\theta \cos\theta$, where $v_r$ is the range rate. These expressions again clearly show how errors in the bearing data ($\theta$) can cause large errors in the initial target tracking for long range targets.

In accordance with the present invention, in order to reduce the effect of bearing data error on the initial target tracking determination, the $v_\theta$ calculation is attenuated by an attenuation factor "a" that is a function of target range, or $v_{74} = a * v_\theta$ where $a = f(r)$. As an example, the value for a can be linearly changed in relation to range out to a range limit beyond which bearing data is considered too unreliable. Thus, for $r \leq 1$, $a = 1$, for $1 < r < 10$, $a = 1.0889 - 0.0889 * r$; and for $r \geq 10$, $a = 0.2$ [where the values of r are expressed in nautical miles]. This is but one example, of course. Other functions of a vs. r could be used depending on the particular application.

Thus, the value of the calculated $v_\theta$ is attenuated more at farther target ranges. This will have the effect of lessening the impact of bearing errors on initial determinations of the target velocity.

Having thus provided a general description of the target initiation and tracking process, what follows is a detailed explanation of the data association processes.

It is important to note that for any given reply signal, some or all of the parameter information may be available. For example, in the described embodiment, bearing data is only available for reply signals detected by the top antenna 12. Differential azimuth and ID information are only available from passive reply signals. Thus, for clarity, understanding and ease of explanation of the invention described herein, reply signals (and associated reply reports) will not be distinguished as to the particular data available or whether they are active or passive, except to the extent that such distinctions are useful in explaining a feature of the invention. The data association algorithms described herein are presented in a manner that assumes one or more of the parameters will be available from a reply signal, however, all parameter data is not required for all reply signals.

As shown in FIG. 1, the system 10 includes a transmitter section 16 which in this case produces a 1030 MHz pulse amplitude modulated drive signal that is coupled to the top antenna 12. The system 10 is configured to use similar 1030 MHz interrogation signals as used in the secondary surveillance radar portion of the ground base air traffic control system. The system 10 interrogation rate, however, is typically much slower than the interrogation rate of the SSR system, and is on the order of an interrogation sequence every one or two seconds. Each interrogation sequence may include a multiple number of interrogation transmissions.

The 1030 MHz interrogation signal is transmitted from the top antenna 12. A main processor 18 is programmed so as to control, through appropriate timing logic, when the transmission cycles begin and end for the 1030 MHz transmitter 16.

The top antenna 12 also functions as a directional receiving antenna for providing bearing information. In this case the antenna is preferably a four element or monopole array formed in the shape of a square (not shown). The output of each of these four elements can be combined, summed and subtracted in a conventional manner so as to produce a sum channel 20 and delta channel 22. As is known to those skilled in the art, these sum and delta channel signals have a relative phase relationship with respect to each other that is an indication of the bearing of the aircraft that transmitted the reply signal. The sum and delta channel signals 20,22 are input to respective sum and delta channel receiver sections 24,26. In the described embodiment, the received signals are characterized by a modulated high frequency carrier signal of 1090 MHz and the receiver sections 24,26 are used in a conventional manner to convert the sum and delta channel signals to a lower intermediate frequency (IF) which in this case is about 60 MHz.

The delta channel receiver 26 is also used to produce a log video signal 28 for the top antenna. As is known, the log video signal 28 is an amplitude versus time signal that allows for a determination of the time of arrival of the various pulses that can be received as part of each reply signal. In particular for TCAS I, a pair of bracket pulses (F1 and F2) are transmitted that mark the beginning and end of the reply signal altitude code (i.e. the twelve altitude code data bits are transmitted between the bracket pulses, the latter being spaced apart by approximately 20.3 μsec). The time of arrival (TOA) of the F1 pulse is used as the time marker for a reply signal that is detected and decoded by the reply processor. The time of arrival data of a reply signal when referenced to the interrogation time provides a differential time of arrival (DTA) value that directly corresponds to the range of the target that sent the reply signal.

The IF sum and delta channel signals 21,23 are input to a phase comparator 30. The phase comparator 30 may be conventional in design and produces two output signals that are generally referred to as the in-phase and quadrature signals 32,34. Hereinafter the in-phase signal 32 will be represented by a capital letter I and the quadrature phase signal 34 will be represented by the capital letter Q. As is known, the I and Q signals basically represent the sine and cosine components of the relative phase angle (i.e. reply signal bearing) between the sum and delta channel signals. Thus, a calculation of the arc-tangent function of the I and Q signals can be performed to compute the phase angle or bearing of the corresponding received signal. In actual practice, a look-up table can be used to provide the angle information based on the I and Q values so that the arctangent computation can be obviated for unburdening the processing calculations. Use of the look-up table, in conjunction with a preferred calibration method and apparatus, is described in co-pending U.S. patent application Ser. No. 08/153,737, entitled "CALIBRATION METHOD AND APPARATUS FOR RECEIVING TRANSPONDER REPLY SIGNALS," filed on even date herewith, which is commonly owned by the assignee of the present invention, the entire disclosure of which is fully incorporated herein by reference.

The phase angle thus derived from the I and Q signals corresponds to the angle of arrival (AOA) of each of the pulses received as part of a reply signal. It should be noted again that multiple reply signals may be received during a listening period that follows an interrogation transmission by the interrogating aircraft. Each of these reply signals may contain a number of data pulses, and the reply signals and pulses received from different aircraft may overlap in time with each other. The listening period is based on the range from which responding aircraft replies are to be detected, and may be dynamically controlled if desired for a particular application. In the embodiment described herein, a listen in window is opened for up to 400 μsec which corresponds to about 34 nautical miles.

Thus, from the directional top antenna 12, I and Q signals as well as a log video signal are produced for each pulse received by the antenna whether the pulses are data related pulses or bracket pulses. The I and Q signals 32,34 and the log video signal 28 are input to a reply processor 40.

In the embodiment illustrated in FIG. 1, the system 10 further includes the bottom antenna 14 which in this case is a single monopole antenna that does not provide directional or bearing information such as is provided by the top antenna. The bottom antenna is, with respect to the present invention, primarily used as a second source of time and amplitude information for the received reply signals in the event that the signals received by the top antenna are too garbled to permit clean identification, or are not received at all by the top antenna (which can occur, for example, when a target is directly below the interrogating aircraft). The bottom antenna signals, therefore, can be used to maintain a target signature based on altitude and range information only, for a number of interrogation sequences until the directional information from the top antenna can be reacquired.

Signals received by the bottom antenna 14 are coupled to a bottom antenna receiver 42 which converts the bottom antenna signals to a corresponding log video signal 44 at the video frequency. This bottom antenna log video signal 44 is also input to the reply processor 40, which detects and decodes the bottom antenna reply signals to provide amplitude, altitude, code and TOA data for each reply signal.

For purposes of understanding the present invention, it will suffice to understand that a basic function of the reply processor 40 is to analyze the data available for each received pulse in each reply signal detected by both the top and bottom antennas, in order to identify pulses that can be matched together as belonging to a reply signal, and to also then determine the reply signal altitude code. The reply processor 40 performs these functions for all reply signals received during the listen in period following an interrogation. For each reply signal detected (active and passive), the reply processor arranges the corresponding altitude code, differential azimuth (DAZ) data and aircraft ID code, reply signal bearing (AOA) data (top antenna reply signals only), and reply signal DTA data into an electronic report hereinafter referred to as a target report, and sends all the target reports to, or are accessed by, the main processor 18 in order to develop target signature initiation and update information. Thus, the main processor 18 can receive target reports for top and bottom antenna detected reply signals-each report is, however, flagged as to which antenna it was received by. The reply processor 40, however, does not determine whether each target report is valid, and may issue multiple reports on the same target, or the target reports could include unwanted reports from multipath reflections.

A detailed description of the reply processor 40 will be found in U.S. Pat. No. 5,587,915 entitled "METHOD AND APPARATUS FOR DETECTING AND DECODING TRANSPONDER REPLY SIGNALS" filed on even date herewith, and commonly owned by the assignee of the present invention, the entire disclosure of which is fully incorporated herein by reference.

After an interrogation signal is transmitted through the top antenna 12 and delta channel 22 by the interrogating aircraft, the main processor 18 sends a listen-in-window (LIW) control signal 48 to the reply processor 40. The LIW signal 48 is used to control the time period following each interrogation in a sequence during which a valid reply signal or signals are permitted to be received and processed. In this case, each LIW period is open up to about 400 μsec. The LIW signal thereby provides a reference time from which the TOA information can be used to derive a DTA value for each target report. As explained in the referenced co-pending application, the F1 pulse, transmitted by a target as part of a target reply signal, is used to mark the DTA of the reply signal.

Figure 2:
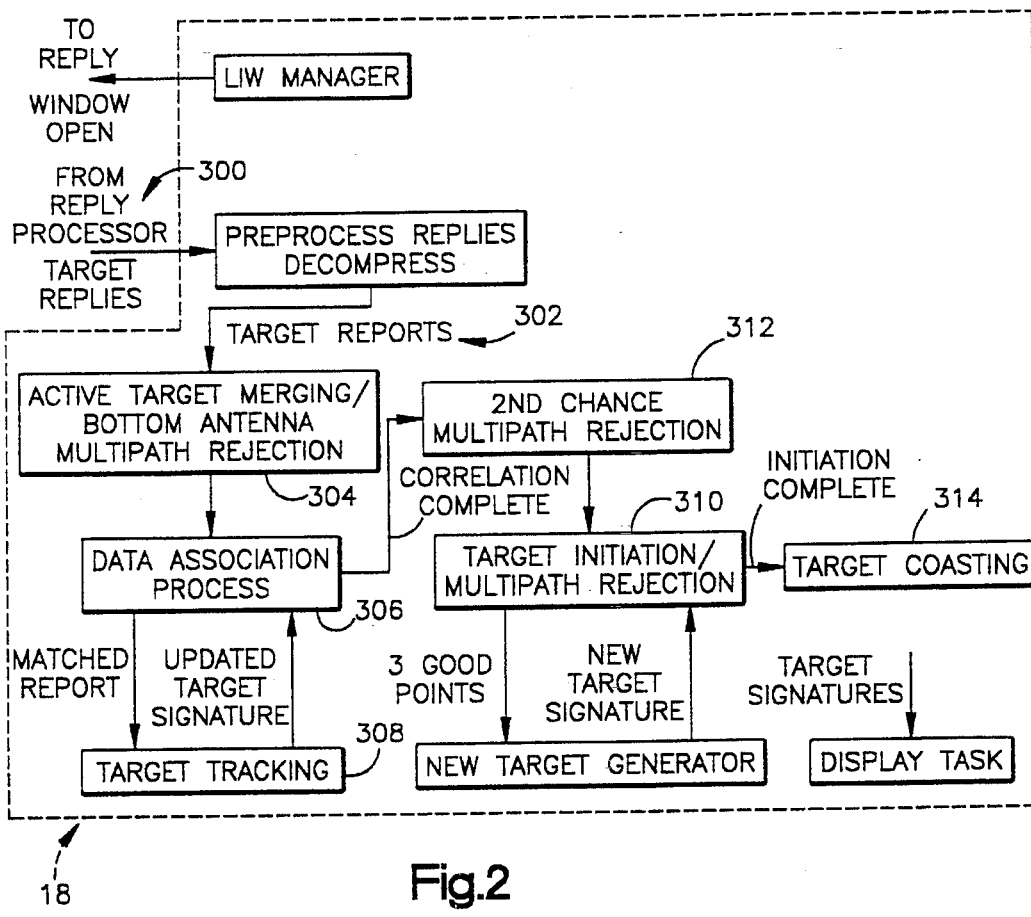
FIG. 2 is a functional block diagram of a main processor circuit suitable for use with the system of FIG. 1 in accordance with the invention.

With reference next to FIG. 2, there is shown a functional block diagram for a main processor suitable for use with the apparatus 10. Functional operation of the main processor 18 with respect to the present invention for data association of target reports to target signatures is primarily realized in the software control program for the main processor. The hardware implementation of the main processor functions can be realized with the use of a conventional microprocessor, such as device 80960KB available from Intel Corporation, in combination with the usual support peripheral hardware such as timing circuits, ROM and RAM devices and so on. The microprocessor can be programmed in a conventional manner in accordance with the manufacturer's specifications, to implement the flow diagrams and functions described herein.

The main processor 18 receives the target reports from the reply processor 40 in a data compressed format noted at 300, and expands the input target report data into the separate target reports (302) as described hereinabove. The data compression is used primarily to reduce the time required for data transfer between the reply processor 40 and the main processor 18, however, data compression is not required and forms no particular part of the present invention.

It is noted again that each group of target reports that are transferred to the main processor, are all the reports that correspond to the reply signals detected by the reply processor 40 during a single LIW period following an interrogation. The system 10, of course, will process all reports for all LIW periods following interrogations (in this case interrogation sequences are transmitted about every two seconds) throughout normal operation of the system 10.

The target reports 302 are loaded into a memory 304 in the form of a list arranged in temporal order such that the first target report received is first on the list. The list is assembled with both top and bottom antenna reports together, simply arranged in order of detection.

This initial listing of all the target reports is analyzed for target report merging and a first pass multipath rejection process. The target report merging process is used to reject multiple target reports. Such multiple reports can derive, for example, from target reply signals received by the interrogating aircraft, for example, because of multiple replies from a single target resulting from the whisper/shout interrogation sequence.

The first pass multipath rejection process is used to reject bottom antenna target reports based on a comparison with top antenna target reports. This first pass multipath rejection process is thus directed to finding multipath target reports that likely are the result of multipath reception from indirect travel of the corresponding reply signal from the target to the bottom antenna of the interrogating aircraft, such as from Earth reflection (i.e ground reflected multipath targets are likely to be detected by the bottom antenna). The phrase "first pass" has no particular significance other than to distinguish the multipath process at 304 from the multipath processes at 310 or 312. The reference to "first" pass (or "second" chance as that term is used hereinafter) should not be construed as a requirement that the multipath rejection processes occur in any particular order or time or even together in the same system, however, the data flow described herein is preferred.

A detailed description of the target report merging and first pass multipath rejection algorithms is set forth in copending U.S. patent application Ser. No. 08/153,724 entitled "METHOD AND APPARATUS FOR MULTIPLE REPLY REJECTION WHEN DECODING TRANSPONDER REPLY SIGNALS", filed on even date herewith, and commonly owned by the assignee of the present invention, the entire disclosure of which is fully incorporated herein by reference.

In general, the target report merging and multipath rejection processes are carried out using the temporal target report list, and marking out (i.e. flagging with a data bit) those target reports determined to be a multiple report or from multipath travel. Any target report marked out (flagged) as multiple or multipath is discarded before the remaining reports are sent on for further processing. Thus, these first pass processes act as a target report filter to try to reduce the number of reports sent on for data association, target tracking and target acquisition.

After the target report merging and first pass multipath rejection processes are complete, the remaining unmarked target reports are sent to a data association process 306, and thereafter for target tracking 308 and target initiation 310 processes. The data association process 306 is described in detail hereinafter, and is primarily used to determine which target reports best match existing target signatures maintained in a target tracking routine 308. The tracking process 308 can be any such process well-known to those skilled in the art such as Kalman filtering, or $\alpha$-$\beta$ filtering, for example.

As previously described herein, target signatures are a set of parameters that are obtained from target reports that identify target position and movement. The parameter values of those target reports that are a best match for respective target signatures are then used to update the target signature in the target tracking process 308. The present invention is directed to the determination of the best matches between target reports and previously established target signatures. Thus, the actual target signature update process and target tracking process form no particular part of the present invention, other than to the extent that the data association process permits the accurate update of target signatures as part of the overall system 10 operation.

As will be described, the data association process may include an altitude code repair process which can be used to repair garbled altitude codes to improve the data association accuracy in some cases.

After the data association process 306 is completed, any target reports not used to update existing target signatures are compared with target reports that were used for such updates, in a second chance (pass) multipath rejection process 312. The second chance multipath rejection process is described in detail in the referenced co-pending patent application, and relates to filtering top antenna target reports on the premise that top antenna multipath reports will not typically be rejected by the first pass multipath process and report merging process.

Target reports which are not used to update target tracks (based on matching with target signatures in the data association process 306), and which are not filtered out in the second chance multipath process 312, are used for attempting to establish or initiate new target tracks at the initiation process 310 and the new target generator process 311. If a new track can be established, the corresponding target signature 313 is made available to the target tracking process 308.

After target initiation and tracking, any target signatures that have not been updated with a measurement from the current surveillance update (i.e. the current interrogation cycle) are coasted at the process designated with the numeral 314. Coasting refers to maintaining a track for a period of time over a number of surveillance updates during which data updates are missed or unavailable for a track. After a predetermined coasting period the target signatures are dropped if not updated.

In accordance with the invention then, the data available during the data association process includes the temporal target report list, from which a number of target reports may have been marked out as a result of the report merging and multipath rejection processes at 304; and also a list of target signatures that each correspond to a target being tracked. The target signature data used in the data association process 306 will be the predicted target signature parameters based on the time that the target reports were received. The data association process 306 is then used to analyze these remaining target reports to see which ones can be matched to these predicted target signature parameters (corresponding to existing targets being tracked by the tracking process 308). Therefore, as used herein to describe the data association process 306, the term "target signature" should be understood as referring to predicted parameter values for each target signature. In particular, the data association process 306 selects the best match of a target report to a target signature, because in a multiple reply environment, more than one detected reply may appear to correlate with one or more target signatures.

The data association process 306 will first be described as to the basic operations involved, and then a detailed description of the related algorithms will follow.

Figure 3:
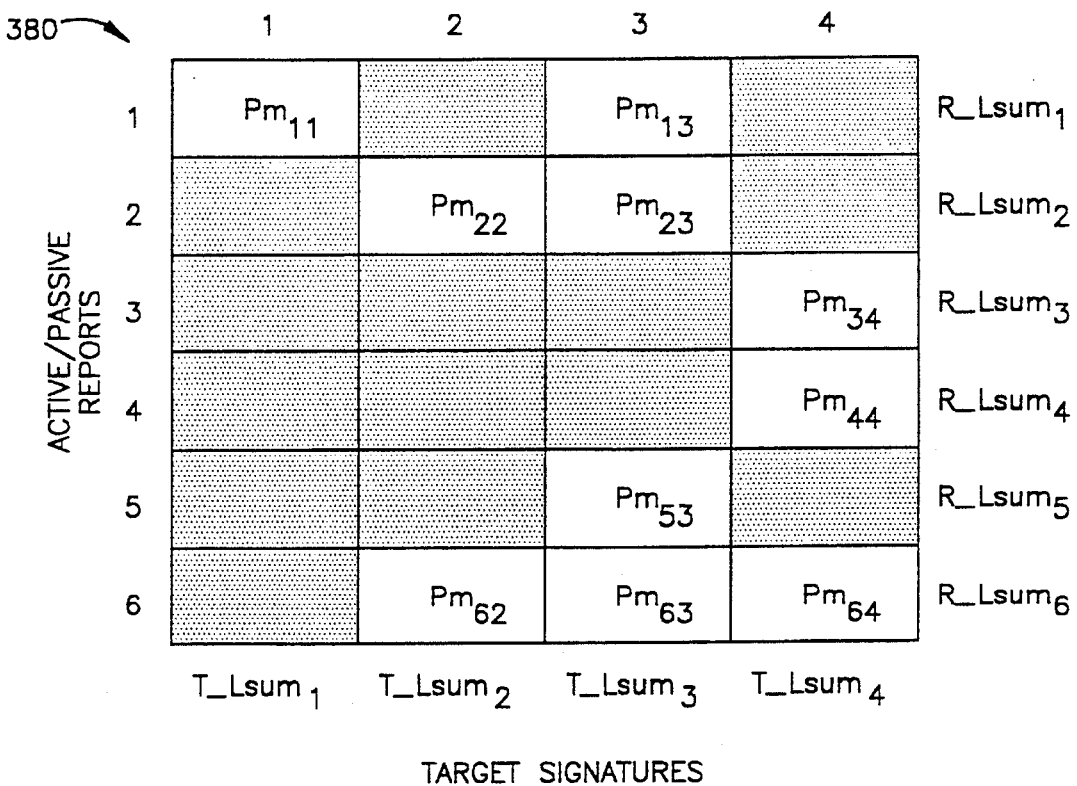
FIG. 3 is a diagrammatic representation of a data table established as part of a data association in accordance with the invention.

With reference to FIG. 3, there is shown a table 380 that is created based on which target reports are determined to be potential matches to the various target signatures available for update and tracking. In the example of FIG. 3, six target reports are identified and four target signatures, however, these numbers are merely examples. Any number of reports and signatures can be analyzed, although at least one report and one signature are needed, otherwise data association is not required.

Those skilled in the art will readily understand that in actual practice the table 380 of FIG. 3, hereinafter referred to as the "match table 380", is created in software and thus is actually an electronic table stored in a digital memory that is part of the main processor hardware 18. The table can be realized as simply a cross-reference between reports and signatures that meet the potential match criteria. Thus, the depiction and description of a "match table" is used for primarily explanatory purposes to clarify the process involved in associating target reports and target signatures. Whether in practice an actual table is created in a memory array or some other representation of the data correlation is used is of no particular importance to practice of the present invention.

The match table 380 is basically an array that indicates which target reports are potential matches to which target signatures. For each potential match, a probability of match, $P_m$, is computed and stored. Thus, for example, in the table of FIG. 3, target report #1 was identified as a potential match to target signatures #1 and #3. As another example, target report #5 was identified as a potential match to target signature #3. As still a further example, the match table of FIG. 3 can be viewed as indicating that only one target report (#1) was potentially matched to target signature #1, while four target reports (#1, #2, #5 and #6) were identified as potential matches to target signature #3. Conversely, the match table 380 indicates (by the shaded regions) which target reports were not matched to particular target signatures. Thus, if a $P_m$ value is not available, then that particular report/signature pair is not considered to be a potential match.

At this time, when the match table 380 is generated, the target report/target signature pairs are only considered to be potential matches. This is apparent, for example, by looking at target signature #3 for which four different target reports were identified as possibly matching. Thus, until the best match is determined, it is not known which target report parameters, if any, will be used to update a particular target signature. In accordance with an important aspect of the invention, the data association process not only determines which reports are likely matches, but also which report is the best match for a particular target signature.

For purposes of further explanation, each target report/ target signature potential matched pair will be identified by its $P_m$ value and location in the match table by row and column subscripts r (for report #) and t (for target signature #). Thus, for example, $P_{m2,3}$ refers to the potential match of report #2 (row #2) with target signature #3 (column #3), and so on. Since each value $P_m$ represents a probability of a match between the two associated items, each target report (row) will have a total likelihood of match sum represented $RLsum_r$, and each target signature (column) will have a total likelihood of match sum $TLsum_t$. In other words, the total likelihood that report #2 matches a target signature would be the sum of the probabilities that report #2 matches signatures #2 and #3, or $RLsum_2 = P_{m\,2,2} + P_{m\,2,3}$. On the other hand, the total likelihood that a target report matches target signature #4 would be the sum of the probabilities that reports #3, #4 and #6 match signature #4, or $TLsum_4 = P_{m\,3,4} + P_{m\,4,4} + P_{m\,6,4}$.

As stated herein, each established target signature includes the predicted parameter values for the target based on the target's position and movement relative to the interrogating aircraft. In the described embodiment, in order to qualify as a potential match, each target report must fall within specified gating criteria for the predicted DTA, predicted AOA (if available) and predicted DAZ (if available). The altitude code (ALT) and the aircraft ID code (if available, and hereinafter IDENT) do not necessarily have to fall within the gating criteria, however, if the altitude code does not fall within the gating criteria and is not garbled, then the report will not be considered a match. If the altitude code is garbled, an attempt will be made to repair the altitude code.

In the described embodiment, the gating criteria (gate sizes) for a potential match are as follows:

---

$1.5 \; \mu sec \leq$ DTA GATE $\leq 3.0 \; \mu sec$
$30° \leq$ AOA GATE $\leq 40°$
$200 \; ft. \leq$ ALT GATE $\leq 300 \; ft.$
$10° \leq$ DAZ GATE $\leq 45°$

---

Ranges for the gates are provided because the gates can be dynamically controlled for each target signature, if so desired.

For example, if the AOA gate is 30°, and a target report AOA value is 25° from a target signature predicted AOA value, then there is a potential match on that parameter. If the target report altitude code is 400 ft. from a target signature predicted altitude code, then those two items do not match on that parameter.

For each target report/target signature combination that potentially match for one or more of the DTA, AOA and DAZ parameters, the probability of match for each parameter is calculated. These probabilities of match for each parameter are identified as:

Pdta=probability of match on DTA
Palt=probability of match on ALT
Paoa=probability of match on AOA
Pdaz=probability of match on DAZ
Pident=probability of match on IDENT Each of these parameter probability of match, in the embodiment described herein, are limited to a range of probabilities. This aspect arises from studies of empirical data and a recognition that inherent inaccuracies in the data collection process limits the level of significance to be attributed to missing data. Therefore, in this case, the corresponding ranges for the parameter probabilities of match are defined as follows:

$0.20 \leq Pdta \leq 1$ $0.20 \leq Palt \leq 1$ $0.25 \leq Paoa \leq 1$ $0.25 \leq Pdaz \leq 1$ $0.31 \leq Pident \leq 1$ Each parameter probability of match is computed as a ratio of how close the target report value came to the predicted target signature value, relative to the size of the gate (keeping in mind that these gates can be dynamically controlled if desired). For example, Pdta is defined as follows:

$$Pdta = 1 - 0.8(DTA \; difference/DTA \; Gate)$$

where DTA difference is the absolute difference between the DTA values of the target report and target signature being compared, and the DTA gate is the gate size for the comparison. The parameter probabilities of match for Palt, Paoa and Pdaz are calculated in a similar manner, as will be apparent from the flow diagrams provided herein.

The probability of match for aircraft ID data (Pident) is calculated in a different manner because the data is in the form of a multibit code. In this case, Pident is assigned a value based on how many bits of the target report ID code match a target signature ID code. The Mode A ID code is a twelve bit code. If all twelve bits match, Pident is set to 1. If eleven bits match, Pident is set to 0.734. If ten bits match, Pident is set to 0.719. For a match on zero to nine bits, pident is calculated by the equation:

$$Pident = 1 - \left[ \frac{32 + (12 - \# \; Bits \; Matched)}{64} \right]$$

Therefore, each target report is compared with each available target signature to determine if there is a potential match. This comparison is done for each parameter that is available to both the report and the signature. If a parameter is not available to both the report and signature, then that parameter's probability of match is assigned a zero value. For example, if a target report is based on a reply signal picked up by the bottom antenna 14, then AOA data for that reply signal is unavailable. Consequently, regardless of which target signature the report is compared to, the Paoa value will be assigned a zero.

After all the probabilities of match are computed for each parameter, the $P_m$ value for the report/signature pair is computed and entered in the match table.

In the embodiment herein, each $P_m$ value is computed as a weighted probability of the five parameter probabilities of match. This is based on empirical evidence that for TCAs I type environments, the DTA and ALT parameter values are the most useful in trying to match a report with a signature. Therefore, DTA is given a weight of 0.65 (DTAWGT); altitude is given a weight of 0.33 (ALTWGT); AOA is given a weight of 0.005 (AOAWGT); DAZ is given a weight of 0.005 (DAZWGT); and IDENT is given a weight of 0.010 (IDWGT). The $P_m$ value is then calculated as:

$$P_m = DTAWGT*Pdta + ALTWGT*Palt + AOAWGT*Paoa + DAZWGT*Pdaz + IDWGT*Pident$$

where $0 \leq P_m \leq 1$.

After each $P_{m \; r,t}$ value is calculated for each of the potential matches for the match table 380, then a probability of correct correlation ($P_{cc}$) is computed for each potential match in the match table. The $P_{cc}$ value represents the joint probability of a given match ($P_{m \; r,t}$) compared with the other possible report/signature matches. For each potential match, the corresponding $P_{cc}$ value is represented as $P_{cc \; r,t}$ in a manner similar to the $P_{m \; r,t}$ values.

Accordingly, $P_{cc \; r,t}$ is calculated as follows:

$$P_{cc \; r,t} = [P_{m \; r,t}]/[TLsum_t + RLsum_r - P_{m \; r,t} + \epsilon_{new}]$$

where $\epsilon_{new}$=a bias value to account for nonunity probability of detection and noise. In this case, $\epsilon_{new} = 0.10$.

After the $P_{cc \; r,t}$ values are computed for each potential match in the match table 380, the next step is to determine which match is the best match for a particular target report/target signature pair. In cases where a $P_{cc}$ value is substantially higher than all other $P_{cc}$ values, the corresponding match is considered to be a best match. In the present example, if a $P_{cc}$ value is 1.15 times higher than the other $P_{cc}$ values, then the highest $P_{cc}$ match is the best match. On the other hand, matches that have a $P_{cc}$ value substantially less than other $P_{cc}$ values are deemed to not be the best match for the corresponding target signature. In the instant case, if a $P_{cc}$ value is not at least within 0.85 times the highest $P_{cc}$ value, then it cannot represent a best match.

Figure 4:
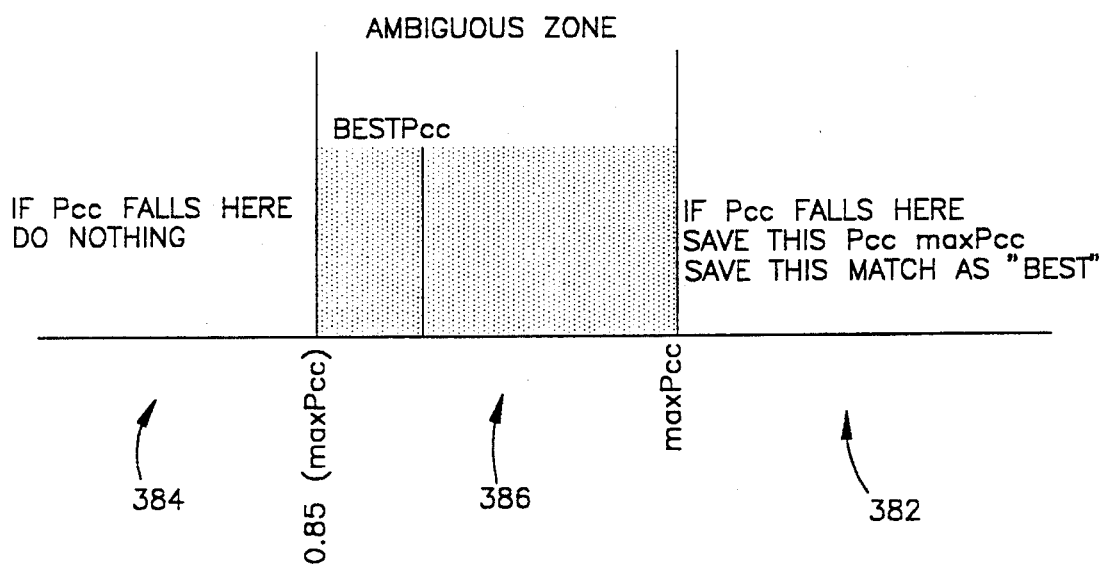
FIG. 4 is a diagrammatic representation of a best match selection criteria according to the invention.

This process of deciding which potential match is the best match is represented in FIG. 4. The process is carried out by going through the entire match table and comparing the $P_{cc}$ value of the current match with every other match in the table. The current match is tentatively designated the best match until another match in the table is found that can replace it. As shown in FIG. 4, if the next match in the table has a $P_{cc}$ value that is higher than the current highest $P_{cc}$ value, as at 382, then that next match becomes the new best match and so on until all matches in the table have been compared. If the next match $P_{cc}$ value is less than 0.85 of the highest current $P_{cc}$ value, as at 384, then the current match retains its designation of best match. However, if the next match in the match table is within 0.85 of the current highest match $P_{cc}$ value, then it is considered to be within an ambiguous zone 386. This ambiguous zone exists because of inherent inaccuracies in the data collection process. In other words, just because a potential match has the highest $P_{cc}$ value does not necessarily mean that it is the best match compared to all the other matches in the match table. For example, two target reports could have $P_{cc}$ values within 0.95 times each other. However, the report with the lower $P_{cc}$ value may have a perfect match on the altitude code or AOA value, whereas the report with the higher $P_{cc}$ value may be closer on DTA, but not have as good a match on AOA and altitude. In such a case, the match with the lower $P_{cc}$ value probably is the better match and will be selected as the best match.

This process of comparing all potential matches with each other in the match table to find the best match is continued until each potential match has been analyzed. Once a best match is found, the associated target signature is updated with the matched parameter data of the target report in the target tracking process 308 (FIG. 2). After this update, the system returns to the data association process 306, the matched report is marked so that it cannot be used to update another target signature, and the rest of the potential matches are analyzed. This iterative search is continued for the next "best" possible match until all the reports have been used, all the signatures have been updated, or there are no more matching reports to signatures.

Figure 5:
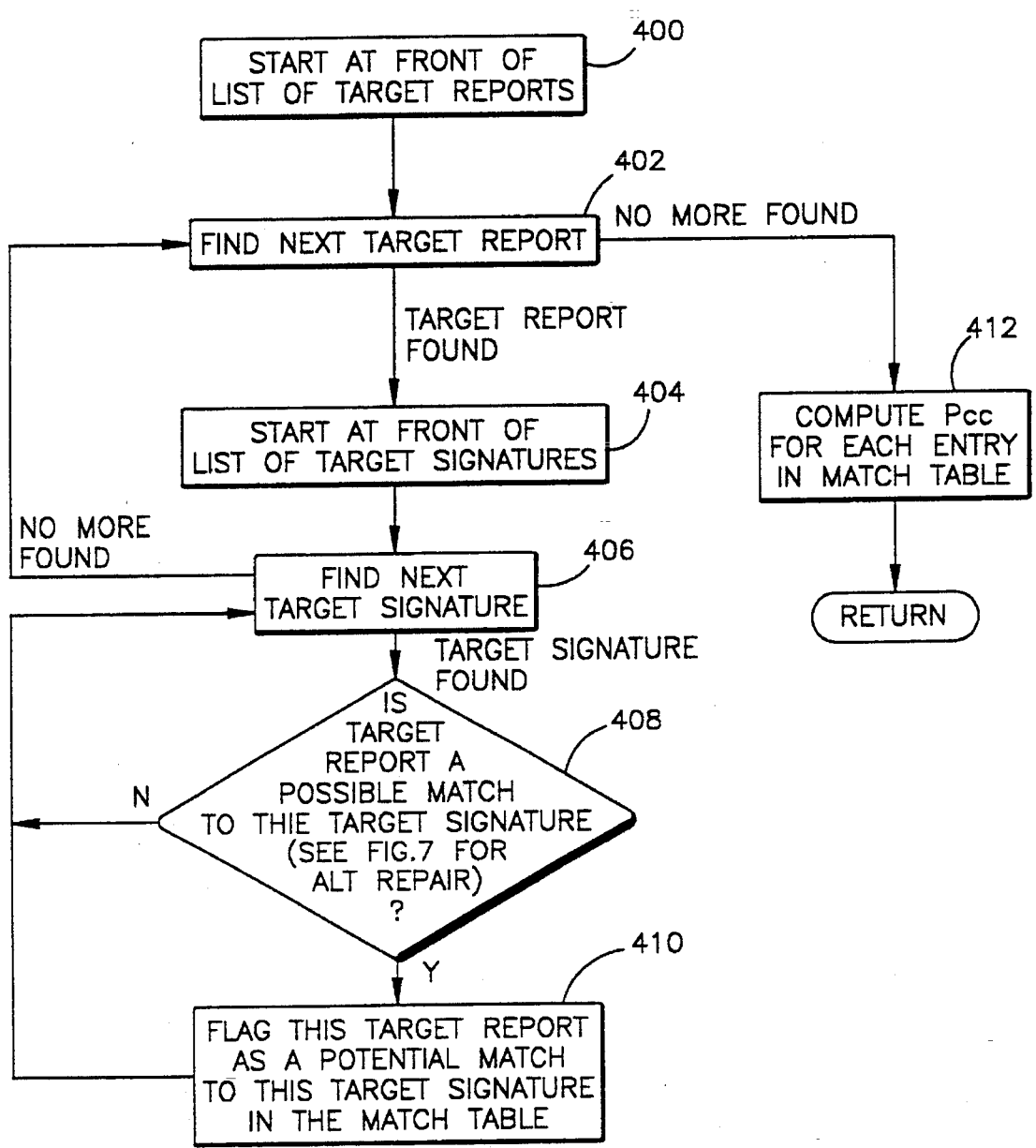
FIG. 5 is a flow diagram, with explanatory text, of a target report/target signature data association process for building a match table of potential report/signature matches according to the invention.

With reference to FIG. 5, there is provided a flow diagram for a process suitable to build a match table such as illustrated in FIG. 3. Basically, this process calculates all the parameter probabilities of match for each potential match between the target reports and target signatures. FIG. 5 shows an exemplary embodiment of such a process.

At step 400 the temporal target report list produced from the target merging and first pass multipath rejection processes 304 (FIG. 2), is accessed. At step 402 the first or next target report is located and at steps 404,406 the first or next target signature is found from the target signature list maintained by the target tracking process 308 (FIG. 2).

Once the next target report/target signature pair has been identified (hereinafter referred to as the "current" report/signature pair), at step 408 the program determines whether this pair is a potential match, and if so computes the parameter probabilities of match as described hereinabove. This matching process at step 408 is shown in greater detail in FIG. 6. If the pair is a potential match, it is flagged as such in the match table 380 and the corresponding $P_1$ value is computed at step 410, then the program returns to step 406 to compare the current target report with the other target signatures. After no more signatures are available for potential matches at step 406, the program returns to step 402 to find the next target report in the temporal list. The process then repeats until all target reports have been compared to all target signatures to build the match table of possible matches. After the table is complete, the program branches to step 412 and computes all the $P_{cc}$ values for each potential matches in the match table.

Figure 6A:
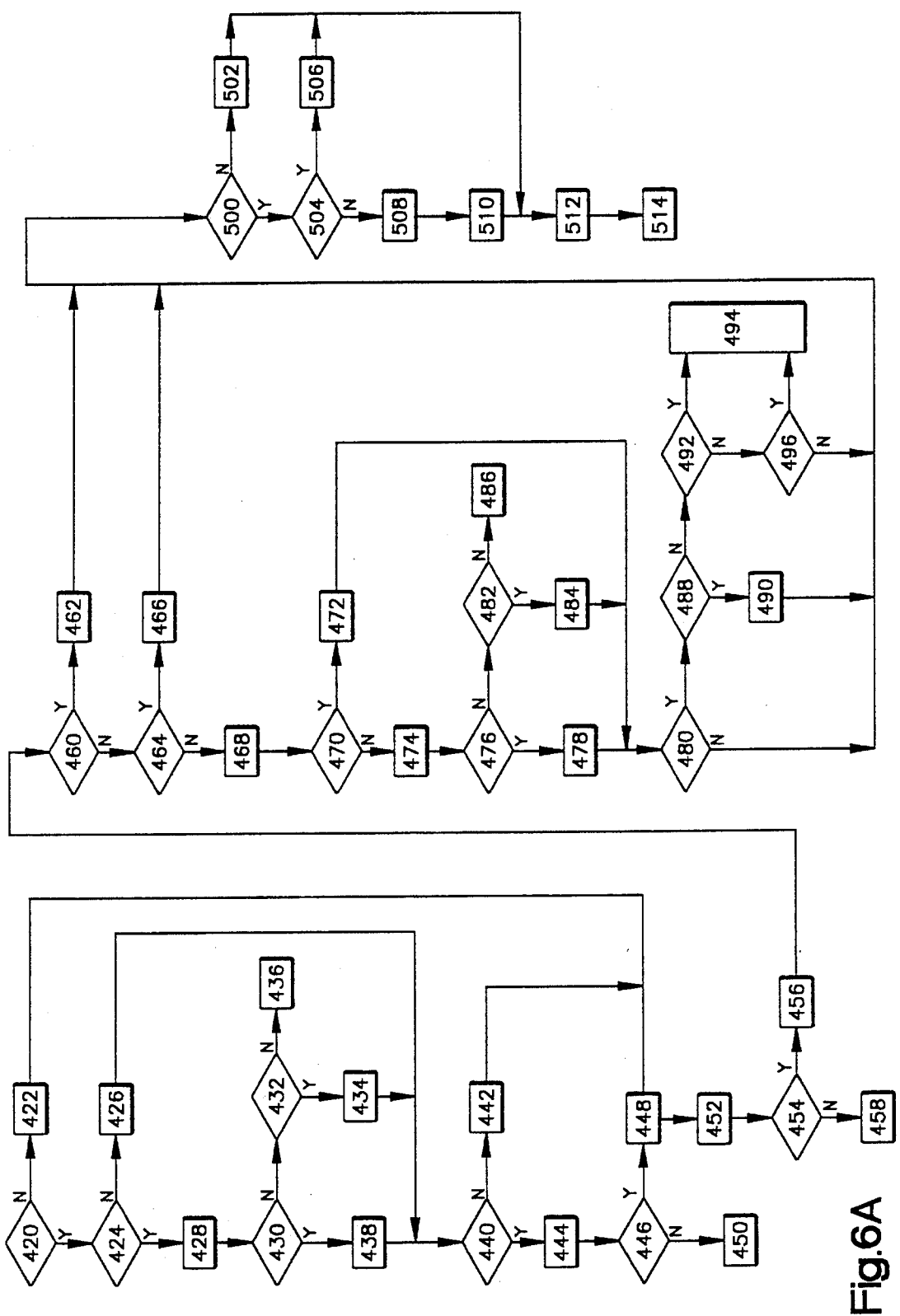
FIG. 6 (parts A and B) is a flow diagram for a parameter matching process that can be used as part of the match table process of FIG. 5.

With reference next to FIG. 6, the process 408 for determining if a particular report/signature pair is a potential match is shown in detail. This process will be described herein for one case of a possible report/signature pair, it being recognized that this process is iteratively performed for all report/signature combinations available for creating the match table.

At step 420 the signature is checked if it has AOA data (bearing). If not, then the routine branches to step 422, assigns parameter probabilities Paoa and Pdaz equal to zero and proceeds to the DTA determination at step 452. If AOA data is available for the signature, then at step 424 the target report is checked for AOA data. If not available, then Paoa is set to zero at step 426 and the program branches to the DAZ determination at step 440. If the target report has AOA data, then at step 428 the absolute difference between the signature AOA (a predicted value based on target tracking) and the report AOA is computed and at step 430 this value is compared to the AOA gate. If the report/signature AOA difference is not within the AOA gate, then at step 432 the AOA difference is checked if it is within 20° of the AOA gate. If so, the report/signature pair can still be identified as a potential match (if all other parameter comparisons are satisfied), but the parameter Paoa is set to zero at step 434 before proceeding to the DAZ determination. If the AOA difference is not within 20° of the AOA gate, then the report/signature pair is not deemed a match and a "NO" is returned at step 436 for the corresponding match table entry.

If the absolute AOA difference was within the AOA gate at step 430, then the Paoa value is calculated at step 438 as $$Paoa = 1 - 0.75[AOA\ difference/AOA\ gate]$$

and a match flag is set on for the AOA parameter. This completes the AOA parameter matching analysis, and as will be apparent the other parameters are determined in a similar manner.

At step 440 the current target report is checked for DAZ data, and if not available, then Pdaz is set to zero at step 442 and the program branches to the DTA determination at step 452. If the target report has DAZ data, then at steps 444, 446, 448 the Pdaz value is calculated if the DAZ difference is within the DAZ gate and a DAZ match flag is set on, or if not within the gate, a "NO" is returned at step 450 for the match table.

At step 452 the program enters the DTA parameter determination routine. If the DTA difference is within the DTA gate at step 454, then Pdta is calculated at step 456; if not within the gate then a "NO" is returned for the match table at step 458.

At step 460 the program checks whether both the report and signature indicate that the target is non-altitude reporting (NAR). If so, then at step 462 Palt is set to one and a ALT score flag is set to MATCH, and the program branches to the IDENT parameter determination at step 500.

If the report and signature are not both NAR, then at step 464 the routine checks if the target signature predicted altitude code is invalid. If so, then at step 466 the Palt value is set to zero and the ALT score flag is set to MISMATCH, and the program goes to step 500. If the predicted altitude code is not invalid, then at step 468 a repair code flag is set to FALSE because it initially is assumed that a repair of the altitude code may not be required.

At step 470 the target report altitude code is checked to see if it is an invalid code and if so, then at step 472 the value Palt is set to zero, the ALT score is set to MISMATCH and the repair code flag is changed to TRUE indicating that an altitude code repair may be necessary. The program then branches to step 480 to attempt the repair.

If at step 470 the current target report altitude code is valid, then the altitude difference between the current report and signature is computed at step 474 and checked against the ALT gate at step 476. If within the altitude gate, then the Palt value is calculated at step 478 and the ALT match flag is set on and the program proceeds to the repair routine at step 480. Because the repair code flag is still FALSE, the program will proceed to step 500.

If the altitude difference at step 476 was not within the altitude gate, then at step 482 the target report altitude code is checked for whether it is garbled, i.e. whether the altitude code has one or two garbled bits. (For an explanation of the garbled bits and how they are determined, reference should be made to the co-pending application referenced herein for the reply processor 40 operation). If the altitude code is garbled then at step 484 Palt is set to zero, the ALT score is set to UNSURE and the repair code flag is set to true. The program then proceeds to step 480 to attempt a repair of the report altitude code. If the code is not garbled, then a "NO" is returned to the match table at step 486 because the altitude difference was outside the altitude gate (step 476) and if not garbled there can be no repair in an effort to attempt to match the report and signature.

If at step 480 the repair code flag had been set to TRUE, then the program attempts a repair at step 488. The repair process at step 488 is set forth in greater detail in FIG. 7. In order to understand the repair process, it should be noted that when the reply processor 40 prepares each target report, if an altitude code was determined then each bit of the code is assigned a garble bit which indicates the confidence level that the bit is a correct value. Assignment of the garble bit is based on a confidence factor determination during the reply signal decoding process which is fully described in the referenced co-pending application relating to the reply signal processing. For purposes of the present invention it will suffice to understand that each bit of an altitude code has a corresponding garble bit tagged to it in the respective report code available to the main processor 18.

Figure 7A:
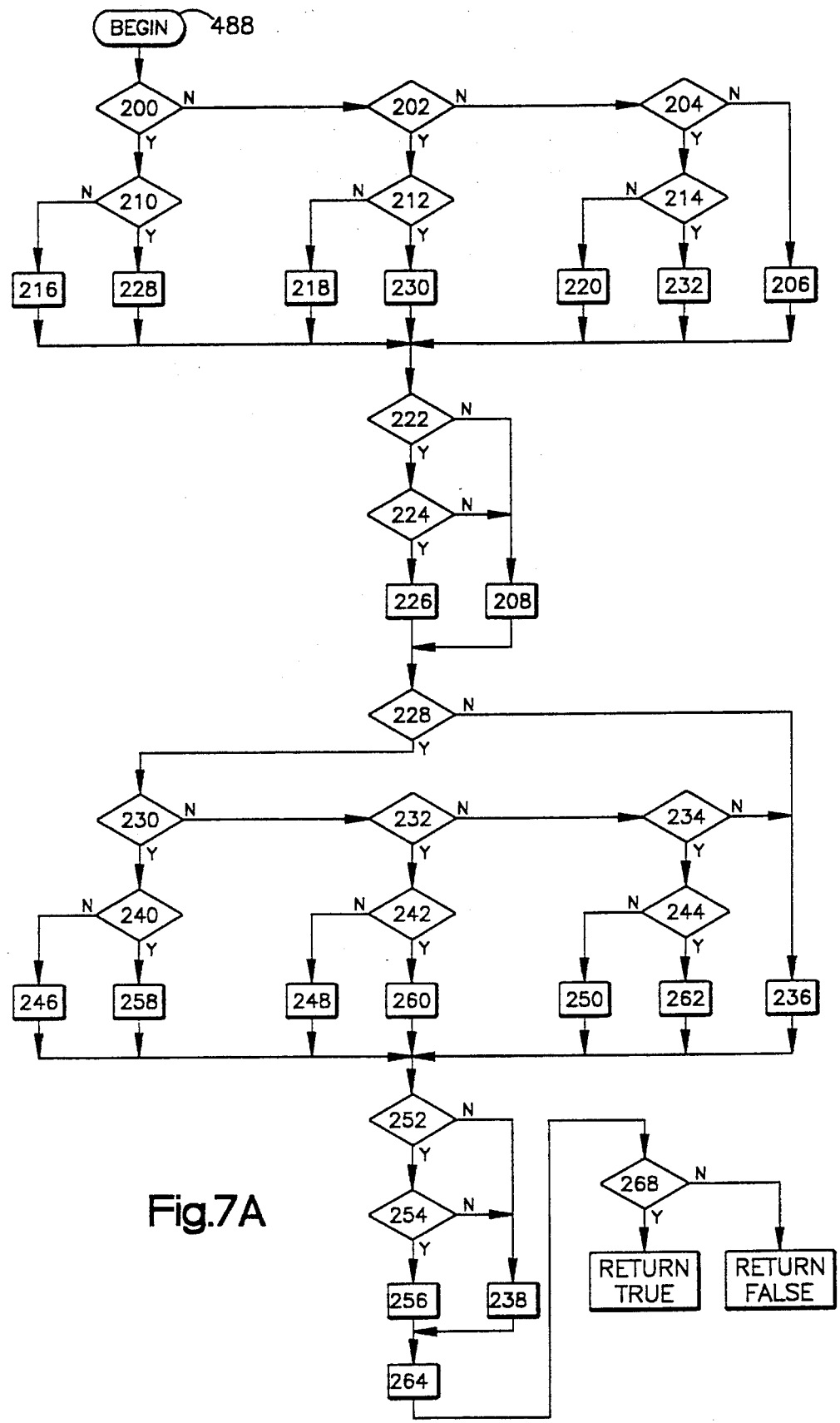
FIG. 7 (parts A and B) is a flow diagram, with explanatory text, of an altitude code repair process according to the invention.

With reference then to FIG. 7, there is shown a flow diagram for a reply code repair process that is facilitated by the use of the garble bits associated with each data bit. As previously stated herein, the reply processor 40 output includes a target report that consists of the twelve data bits transmitted from a responding plane that encode the target's altitude. The altitude code is generally designated herein as a four digit octal code, ABCD, in which each octal digit actually includes three data bits (there are three A bits, three B bits and so on). In the embodiment described herein that is compatible with a TCAs I interrogation, the ABD digits encode altitude in 500 foot increments, and the C digit encodes the altitude in 100 foot increments. In the repair process described herein, altitude tolerance within 500 feet is the target accuracy, therefore, the repair attempt is directed to accurately identifying and/or repairing the ABD bits and then the C bits if needed.

The target report includes the twelve data bits for the digits ABCD and also the associated garble bits. In this embodiment of the invention, repair of the ABCD code is attempted if the total number of garbled bits in the target report is two bits or less.

The general concept of the repair process uses two distinct techniques to try to repair the altitude code. Both techniques are used in order to find the best fit for the altitude code bits. The first technique attempts to match the altitude code reported by the reply processor 40 to one of three predicted codes that are based on the tracking information for the aircraft that responded with the reply code of interest. In other words, the repair activity is based on having a track established in the tracking process 308 (FIG. 2) that the altitude code is trying to be matched to. For purposes of the present invention it is sufficient to note that the main processor 18 controls the tracking process based in part on the target reports issued by the reply processor. Once a track has been established for a responding target aircraft, the main processor 18 predicts the target altitude expected from subsequent interrogations based on target position and movement. Thus, the main processor 18 determines an expected altitude ABCD code, and then also determines the two ABCD codes for ±500 feet from the expected code. Because each ABD code represents a range of 500 feet, the repair activity window includes a total of 1500 feet.

In the first repair technique, the actual altitude code reported from the reply processor as part of the current target report is attempted to be matched to the expected or predicted altitude codes of the current target signature, thus providing a 1500 foot window within which a repair is attempted. This first altitude code matching attempt is performed without regard to the associated garble bits of the ABCD data bits. In the second repair technique, which in this case involves having two or fewer garbled bits in the target report altitude code, the target report altitude code is attempted to be matched to the expected codes from the target signature by disregarding the garbled bits.

With reference to FIG. 7 then, the repair process is initiated by the main processor 18 having the current target report altitude code from step 488 (FIG. 6) including the ABCD bits and associated garble bits. The processor 18 also has the predicted ABCD altitude code bits based on the current target signature. At steps 200, 202 and 204 the report ABD bits (i.e. nine bits) are compared to the expected signature ABD bits and the signature code corresponding to ±500 feet of the expected signature code. If all three tests fail, then at step 206 a REPAIR1 flag value is set to INVALID ALTITUDE, indicating that the report altitude code is outside the expected altitude gate for the signature. The INVALID ALTITUDE setting of the REPAIR1 value is noted at step 208, wherein the main processor is alerted that the first repair technique cannot be used.

If one of the ABD tests at steps 200, 202 or 204 pass (and only one can pass for a given report altitude code), the target report C bits are checked if they are valid at steps 210, 212 and 214 depending on which ABD test passed. If the C bits are not valid, then at steps 216, 218 or 220 (depending on which applies), the signature (predicted) C bits are used with the report ABD bits to compute the REPAIR1 value. At step 222, if the REPAIR1 value is not set to INVALID ALTITUDE (which case was previously described herein wherein the program would branch to step 208), the program checks at step 224 whether the value of REPAIR1 falls within the appropriate altitude gate. The altitude gate represents the allowable tolerance for altitude change of the responding aircraft.

If the value of REPAIR1 is outside the altitude gate, then the first repair method is not used (step 208). If the computed REPAIR1 value is within the altitude gate, then at step 226 the goodness of the fit is determined such as by calculating Palt at step 226.

If at steps 210, 212 or 214 the C bits of the target report were valid, then at steps 228, 230 or 232 the REPAIR1 value is computed based on the target report altitude code C bits in combination with the matched ABD bits. The computed value of REPAIR1 is then checked against the altitude gate at step 224 and Palt computed at step 226.

The first repair method is thus complete (or not used) when the program reaches step 228. At step 228 the garble bits are checked and if the ABD bits of the report altitude code contain 2 or less garbled bits, the program branches to steps 230, 232 or 234. Note that if the test at step 228 fails (indicating the presence of more than two garbled bits in the ABD bits), the program advances to step 236 and the REPAIR2 value is set to INVALID ALTITUDE. Subsequently, at step 238 the second repair method is declared unusable.

At steps 230, 232 or 234 (whichever applies for the particular ABD bits being analyzed), the ABD bits of the current report altitude code are compared with the expected signature code, as well as with the corresponding codes for ±500 feet from the expected code, in a manner similar to the test performed at steps 200, 202 and 204. The difference is that during the second repair method, the garbled bits are ignored for the test at steps 230, 232 and 234. If the ABD bits (without the garbled bits) do not match one of the three expected codes, the program moves to steps 236 and 238 with the REPAIR2 value set to INVALID ALTITUDE.

If a match is found for the reported reply code ABD bits (without garbled bits), then at step 240, 242 or 244 (whichever applies based on the test that passed at steps 230, 232 or 234) the report code C bits are checked if they are valid. If the C bits are not valid, then at applicable step 246, 248 or 250, the REPAIR2 value is computed using the signature predicted C bits in combination with the report ABD bits matched to one of the three expected codes. At step 252 the program checks the value of the REPAIR2 parameter and proceeds to step 254 if the REPAIR2 value is not INVALID ALTITUDE. At step 254 the computed REPAIR2 value is checked if it is within the responding plane altitude gate, in a manner similar to step 224 in the first repair method. If the computed altitude is outside the altitude gate, the REPAIR2 value is set to INVALID ALTITUDE at step 238. If the computed value of REPAIR2 is within the altitude gate, then at step 256 the goodness of the fit (Palt) of the REPAIR2 value to the expected value is computed.

If the report C bits were valid (as determined at steps 240, 242 and 244), then at step 258, 260 or 262 as appropriate depending on which branch the program is in based on the ABD match, the REPAIR2 value is computed using the matched report ABD altitude code bits and the report code C bits. This computed value of REPAIR2 is then compared to the altitude gate at step 254 and if within the gate the goodness of the fit is computed at step 256. If the computed value of REPAIR2 is outside the altitude gate, then the REPAIR2 value is set to INVALID ALTITUDE at step 238.

At step 264 the best value fit of REPAIR1 and REPAIR2 is selected as the correct altitude for the current target report. At step 268 the program determines if a usable repair value has been detected. If so, then the repaired value is returned to the main processor at step 488 (FIG. 6) for use in the data association process. If not, then the repair of the altitude code is returned as "NO" at step 488.

Returning to FIG. 6, if the report altitude code was not repaired, then at step 492 the target report is checked if it was from the bottom antenna. If so, then AOA data is not available and a "NO" is returned to the match table at step 494. The basis for this decision is that a report will not be matched to a signature if there is no match on the altitude nor on the AOA data.

If the report was from the top antenna, then at step 496 the report is checked if it is NAR and if so then a "NO" is returned to the match table at step 494. If the report is not an NAR report then the program proceeds to step 500 for IDENT parameter determination.

If the current target report altitude code had been repaired at step 488, then at step 490 the ALT match flag is set on and the Palt value is computed based on the repaired altitude code value and the signature altitude code value, and the program proceeds to step 500.

At step 500 the current report and signature are checked for whether they have IDENT (Mode A reply in TCAs I) information. If not, then at step 502, Pident is set to 0.5 and the program branches to step 512. If the report and signature have IDENT parameter data, then at step 504 the IDENT codes are checked if they are identical. If identical, at step 506 the Pident value is set to one and the IDENT parameter match flag is set on. The program then proceeds to step 512.

If at step 504 the report and signature IDENT codes did not exactly match, the number of matching bits are counted at step 508 and the value of Pident at step 510 based on the number of bits that match, as described hereinbefore. The program then proceeds to step 512.

When the data association routine reaches step 512, all the parameter probability of match values, if any, have been computed for the current target report/target signature potential match pair. Accordingly, the corresponding weighted $P_m$ value can be computed as defined hereinabove, and at step 514 the match table is updated with a "yes" indication that the current report potentially matches the current target signature. This entire process is then repeated for each target report/target signature combination available to the process.

After all the $P_m$ values have been determined for the potential matches in the match table, at step 412 (FIG. 5) the corresponding $P_{cc}$ value are all computed for each potential match so flagged from the process at step 408, in accordance with the $P_{cc}$ equation described hereinbefore.

Once the $P_{cc}$ values for each potential match has been calculated for the match table, the data association process 306 branches into a match table analysis process in order to determine the best report/signature matches as previously described herein. This match table analysis process is shown in detail in FIG. 8.

The process to determine the best matches begins at step 520 with the first report/signature potential match available set as the current match. In the match table example of FIG. 3, the first available potential match would be $P_{m\,1,1}$. It is not particularly critical where in the table the process begins because all potential matches will be analyzed, however, for simplicity it is convenient to start at the beginning of the table.

At step 522 a group of flags are set to default values. Initially the MAXPcc value is set to zero, BESTMATCH is set to NONE, BESTPcc is set to zero and BESTPaoa and BESTPalt are set to minus one. The purpose of these flags is to keep track of which potential match represents the present best match at any point in time of the process, because the potential matches are simply analyzed in temporal order, not in order of $P_{cc}$ values, for example. When a new best match is found the flags are set accordingly until all potential matches have been compared to the present best match.

At step 524 the current potential match pair is located and if found at step 526 the Pcc, Palt and Paoa values are set to equal the corresponding values for the current match. At step 528 the current $P_{cc}$ value is compared to the MAXPcc value. If the current $P_{cc}$ value is the greater value, then MAXPcc value is updated to be the $P_{cc}$ value of the current match at step 530. If the current $P_{cc}$ value is less than the MAXPcc value, then the MAXPcc value is unchanged. At step 532, the $P_{cc}$ value is checked if it is more than 1.15 times higher than the BESTPcc value, and if so the program branches to step 554. If the $P_{cc}$ value is not more than 1.15 times the BESTPcc value, then at step 534 it is checked for whether it is at least 0.85 times the MAXPcc value. If not, the program returns to step 524 to get the next available potential match. Note that the steps 528, 530, 532 and 534 are used to determine whether the current match pair has a Pcc value that clearly makes it the best match (1.15 time higher than the MAXPcc) or places it in the ambiguous zone, as previously described herein. These steps are carried out for all potential matches in the match table.

If at step 534 the current match pair has a $P_{cc}$ value in the ambiguous zone, then at step 536 the Palt and Paoa values are compared to the BESTPalt and BESTPaoa values. If the current values are both greater, the program branches to step 554. If they are not both greater, then at step 538 the program checks if the current Palt is greater than or equal to the BESTPalt value. If not, then at step 540 the current Paoa value is checked against the BESTPaoa value. If the current Paoa is greater than or equal to the BESTPaoa value, the program at step 542 checks whether the present best match matched on AOA. If it did then the program branches to step 554. If the present best match did not match on AOA but the current match did, then the current match becomes the new best match and the program branches back to step 524 to get the next potential match pair.

Thus, for a potential match that falls in the ambiguous zone of being within 0.85 times the current MAXPcc value, the ambiguous match can become the present best match if the Paoa and Palt criteria are a closer match than the present best match, even though the present best match may have a higher $P_{cc}$ value.

If the current Palt value is greater than or equal to the BESTPalt value at step 538, the program branches to step 544. At step 544, which is reached when 1) the current potential match is in the $P_{cc}$ ambiguous zone with respect to the present best match, and 2) has a higher Palt value than the present BESTPalt value, then the current ALT score is checked to see if it indicates an exact match of the altitude code for the target report and target signature (this flag was set at step 462 or 478 previously described herein) based on the Palt parameter comparison. If the flag is set to EXACT, the program checks at step 546 if the present best match did not match on AOA. If it did not, the program advances to step 554.

If the present best match did match on AOA (step 546 result is no), then at step 548 the program checks whether the current match has an AOA parameter match. If yes, then at step 550 the current match Paoa is compared to the present BESTPaoa, and if greater, the program proceeds to step 554. If the current match Paoa is less than the present BESTPaoa value at step 550, then at step 552 the current Paoa value is checked if it is greater than 0.85 times the present BEST-Paoa value, and if the current Palt value is greater than the BESTPalt value. If both checks are true, then the program proceeds to step 554. If not, the program returns to step 524.

If at step 548 the current match did not have a parameter match for AOA, then at step 556 the routine checks if the current Palt value is greater than the BESTPalt value, and if the target report has an AOA value. If both tests pass, the program proceeds to step 554, but if one of the tests fails the program returns to step 524.

At step 544 if the current match ALT score was not exact, then at step 558 the ALT score is checked if it is UNSURE or MISMATCH (as set at steps 466, 472 or 484, for example). If either condition is true, then at step 560 the present best match ALT score is checked if it is EXACT. If not, the program proceeds to step 546. If yes, the program returns to step 524.

Thus, in general, the steps that can occur between steps 532 and 554 carry out the algorithm described earlier herein with respect to testing whether a potential report/signature match can be selected as a best match based on the Paoa and Palt values when its $P_{cc}$ value is in the ambiguous region with respect to the present best match $P_{cc}$ value as the match table is processed. If so, the first potential match that meets this criteria is selected as the best match by the program branching to step 554.

Thus, a best match can be selected (i.e. the program can branch to step 554) in several ways. First, any potential match that has a $P_{cc}$ value substantially higher (1.15 times higher) than all other $P_{cc}$ values will be selected at step 532 as the best match for the associated target signature. Any potential match that is in the ambiguous region based on the MAXPcc value can be selected as the best match if the ambiguous match is closer for Paoa and Palt values, as tested at step 536. As another example, if an ambiguous match is at least as good as the present best match on Paoa and Palt (steps 538 and 540), and if the ambiguous match was better on AOA than the present best match (step 542), then the ambiguous match will become the best match for that signature.

Figure 8A:
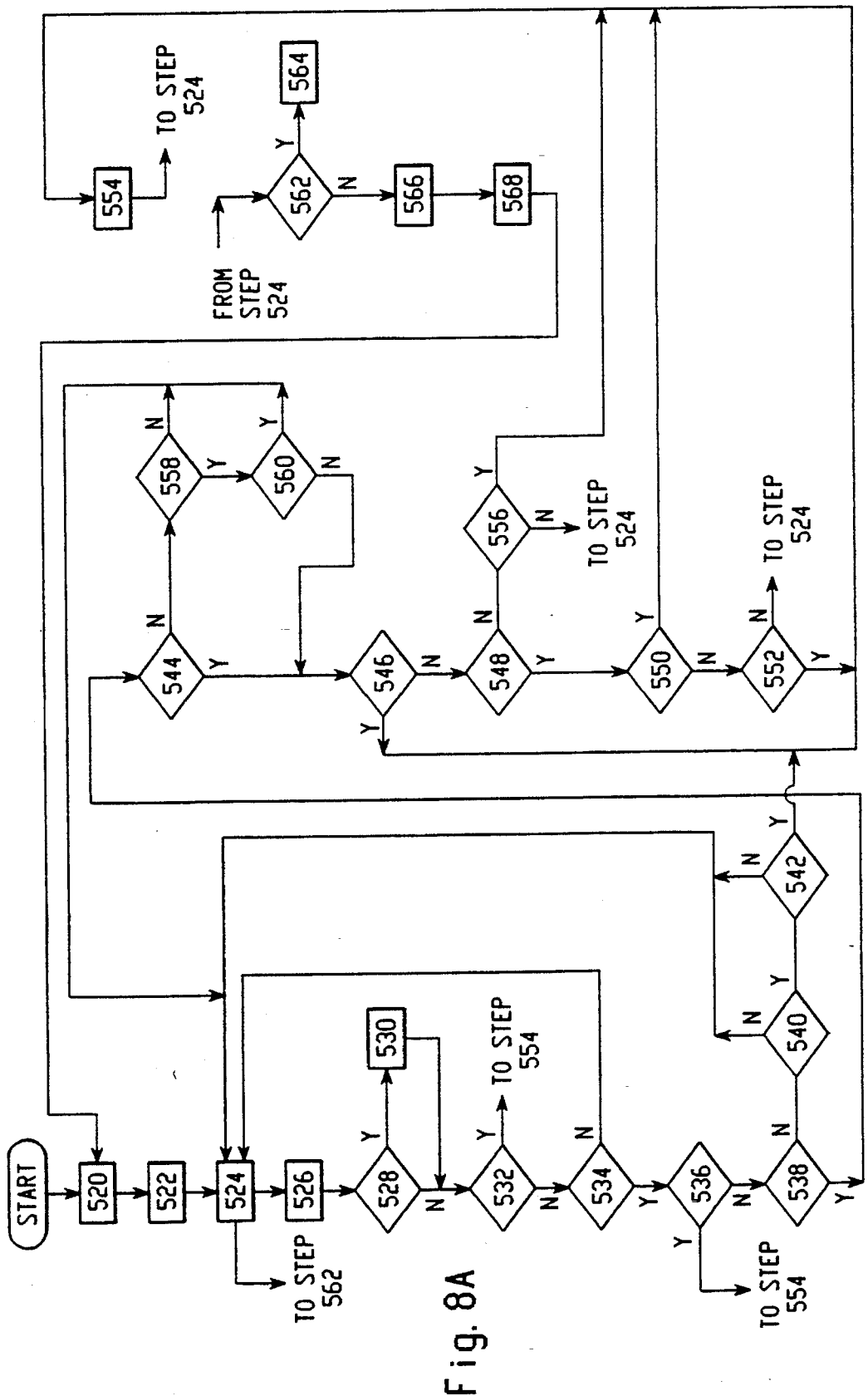
FIG. 8 (parts A and B) is a flow diagram, with explanatory text, of a data association process for selecting the best target report/target signature matches according to the invention.

At step 554 then, the potential match that satisfies the criteria for being a best match is used to set the various flags indicated at step 554 in FIG. 8. Note that at step 524 if no potential match was found to be a best match, then the program branches to step 562.

At step 562 the program checks if a best match was found. If not, the program returns no update at step 564 and the system leaves the data association process 306. If a best match was found, then at step 566 the corresponding target signature is updated with the corresponding data in the best matched target report, and at step 568 the potential match is marked out of the match table so that the target report cannot be used to update any other target signatures, and the program returns to step 520 to find the next best match, if any, based on the potential matches remaining in the match table. The entire data association process is thus iteratively repeated until all possibilities in the match table have been exhausted.

The invention thus provides improved data association for matching target reports and target signatures corresponding to tracked targets for improved target track updating.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A method for associating target reply signals with target signatures, wherein each reply signal is received from a target transponder within a selectable time period, and further wherein each target signature comprises a first set of parameter values that identify a target position and movement relative to an interrogating aircraft, comprising the steps of:

a. producing a target report for each reply signal, each said target report comprising a second set of parameter values;

b. comparing each target report with each target signature to identify which report/signature pairs are potential matches, each comparison between a target report and a target signature being based on comparisons of corresponding parameter values;

c. assigning a probability of match ($P_m$) for each report/signature potential match based on probability of match for each of said compared parameters;

d. assigning a probability of correct correlation ($P_{cc}$) for each report/signature potential match based on a comparison of $P_m$ values of all said potential matches; and e. identifying ambiguous report/signature matches based on comparison of said $P_{cc}$ values of all said potential matches and a best report/signature match from said identified ambiguous matches based on a comparison of said parameters' probabilities of match thereof.

2. The method of claim 1 wherein said parameters may include bearing, altitude, and range.

3. The method of claim 2 wherein said step of identifying report/signature potential matches includes the step of comparing respective parameters when available to determine if respective parameters match within a specified gate.

4. The method of claim 3 wherein said gates are dynamically controlled.

5. The method of claim 3 wherein a potential match is available if the differential time of arrival (DTA) values of the report and signature are within a specified DTA gate.

6. The method of claim 3 wherein each $P_m$ value is a sum of weighted probability of match for each parameter.

7. The method of claim 6 wherein each $P_{cc}$ value is a joint probability of a match based on a comparison with all other potential matches.

8. The method of claim 1 wherein step (e) includes identifying said best match as a potential match that has a $P_{cc}$ value that is a predetermined amount higher than all other $P_{cc}$ values for the report/signature potential matches.

9. The method of claim 8 wherein a potential match that has a $P_{cc}$ value at least 0.85 times the highest $P_{cc}$ value can be selected as the best match based on predetermined criteria.

10. The method of claim 9 wherein a potential match having a $P_{cc}$ within 0.85 of the highest $P_{cc}$ can be a best match if selected parameters exhibit a better match overall.

11. The method of claim 10 wherein $P_m$ is defined as follows:

$$P_m = DTAWGT*Pdta + ALTWGT*Palt + AOAWGT*Paoa + DAZWGT*Pdaz + IDWGT*Pident$$

where
Pdta=probability of match on DTA
Palt=probability of match on ALT
Paoa=probability of match on AOA
Pdaz=probability of match on DAZ
Pident=probability of match on IDENT
and DTAWGT, ALTWGT, ALTWGT, DAZWGT and IDWGT are relative weight values.

12. The method of claim 11 wherein $P_{cc}$ is defined as follows:

$$P_{cc\ r,t} = [P_{m\ r,t}]/[TLsum_t + RLsum_r - P_{m\ r,t} + \epsilon_{new}].$$

13. Apparatus for associating target reply signals with target signatures, wherein each reply signal is received from a target transponder within a selectable time period, and further wherein each target signature comprises a first set of parameter values that identify a target position and movement relative to an interrogating aircraft, comprising:

antenna means for receiving the reply signals and producing phase related signals corresponding to target bearing and video signals corresponding to range based on a differential time of arrival (DTA) value relative to said time period;

means for determining an altitude code associated with each reply signal; and processing means for: 1) producing, for each reply signal, a target report comprising a second set of parameters that includes at least a DTA value and may include altitude and bearing data when available from the reply signal; 2) comparing each target report with each of the target signatures to identify which report/signature pairs are potential matches, each comparison between a target report and a target signature being based on comparisons of corresponding parameter values to provide a probability of match for each parameter comparison; and 3) determining which target reports best match respective target signatures based on a comparison of each report/signature potential match with each other potential report/signature potential match including comparison of said parameters' probabilities of match.

14. The apparatus of claim 13 wherein said processor means assigns a probability of match ($P_m$) for each target/signature potential match based on closeness of matching between said compared parameters.

15. The apparatus of claim 14 wherein said processor means assigns a probability of correct correlation ($P_{cc}$) for each target/signature potential match based on a comparison of $P_m$ values of all said potential matches.

16. The apparatus of claim 15 wherein said processor means comprises memory means for storing a match table that corresponds each target report with each target signature and includes said $P_{cc}$ value for each potential match.

17. The apparatus of claim 16 wherein a potential match is identified as the best match if it has a $P_{cc}$ value that is a predetermined amount higher than all the other $P_{cc}$ values for the other potential matches in said table.

18. The apparatus of claim 17 wherein a potential match that has a $P_{cc}$ value at least 0.85 times the highest $P_{cc}$ value is considered ambiguous and can be selected as the best match based on predetermined criteria.

19. The apparatus of claim 18 wherein each said ambiguous potential match can be selected as a best match over a potential match having a higher $P_{cc}$ value based on comparisons of respective probabilities of match for altitude and bearing parameters.

20. The apparatus of claim 18 wherein said antenna means comprises a directional antenna and a non-directional antenna; said directional antenna producing signals from which target bearing can be derived.

21. The apparatus of claim 20 wherein said target reports include active target reports received in response to an interrogation sent by the receiving aircraft, and passive target reports sent by the target aircraft in response to interrogations other than by the receiving aircraft.

22. The apparatus of claim 14 wherein said processor means determines an altitude code for each reply signal having altitude data and, as part of the determination of potential matches, repairs said altitude code if said code has two or fewer garbled data bits.

23. A method for associating target reply signals with target signatures, wherein each reply signal is received from a target transponder within a selectable time period, and further wherein each target signature comprises a first set of parameter values that identify a target position and movement relative to an interrogating aircraft, comprising the steps of:

a. producing a target report for each reply signal, said target report comprising a second set of parameter values;

b. comparing each target report with each target signature to identify which report/signature pairs are potential matches, each comparison between a target report and a target signature being based on comparisons of corresponding parameter values to produce a probability of match for each parameter comparison; and c. identifying ambiguous report/signature matches based on comparison of each report/signature potential match with each other potential report/signature potential match and a best report/signature match from said identified ambiguous matches based on a comparison of said parameters' probabilities of match thereof.

24. Apparatus for associating target reply signals with target signatures, wherein each reply signal is received from a target transponder within a selectable time period, and further wherein each target signature comprises a first set of parameter values that identify a target position and movement relative to an interrogating aircraft, comprising:

reply processor means for producing a target report for each reply signal, said target report comprising a second set of parameter values; and report processing means for: 1) comparing each target report with each target signature to identify which report/signature pairs are potential matches, each comparison between a target report and a target signature being based on comparisons of corresponding parameter values to produce corresponding probability of match for each parameter comparison; and 2) identifying ambiguous report/signature matches based on comparison of each report/signature potential match with each other potential report/signature potential match and a best report/signature match from said identified ambiguous matches based on a comparison of said parameters' probabilities of match thereof.

25. A method for improving target track initiation comprising the steps of:

a. using a directional antenna to detect reply signals transmitted from a target during discrete time periods;

b. determining a target bearing value for each of said detected reply signals;

c. computing a bearing velocity ($v_\theta$) based on bearing rate of change during said time periods; and d. attenuating said bearing velocity in relation to range of the target.

* * * * *